(12) United States Patent
Yuan et al.

(10) Patent No.: US 10,542,256 B2
(45) Date of Patent: Jan. 21, 2020

(54) METHOD AND DEVICE FOR DETERMINING TRANSFORM BLOCK SIZE

(71) Applicants: Huawei Technologies Co., Ltd., Shenzhen (CN); Tsinghua University, Beijing (CN)

(72) Inventors: Yuan Yuan, Beijing (CN); Xiaozhen Zheng, Shenzhen (CN); Yun He, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 0 days.

(21) Appl. No.: 15/656,899

(22) Filed: Jul. 21, 2017

(65) Prior Publication Data

US 2017/0332076 A1    Nov. 16, 2017

Related U.S. Application Data

(60) Division of application No. 14/141,201, filed on Dec. 26, 2013, now Pat. No. 9,756,329, which is a
(Continued)

(30) Foreign Application Priority Data

Jul. 1, 2011    (CN) .......................... 2011 1 0184380
Jan. 21, 2012    (CN) .......................... 2012 1 0019911

(51) Int. Cl.
*H04N 11/02*    (2006.01)
*H04N 19/119*    (2014.01)
(Continued)

(52) U.S. Cl.
CPC ......... *H04N 19/119* (2014.11); *H04N 19/122* (2014.11); *H04N 19/176* (2014.11);
(Continued)

(58) Field of Classification Search
CPC .................................................... H04N 19/119
(Continued)

(56) References Cited

U.S. PATENT DOCUMENTS 9,049,450 B2 *   6/2015   Hong ................... H04N 19/176
9,100,648 B2 *   8/2015   Kim .................... H04N 19/176
(Continued)

FOREIGN PATENT DOCUMENTS

CN          1751511 A       3/2006
CN        101019435 A       8/2007
(Continued)

OTHER PUBLICATIONS

"Series H: Audiovisual and Multimedia Systems; Infrastructure of audiovisual services—Coding of moving video; Advanced video coding for generic audiovisual services," ITU-T Rec. H.264, pp. i-269, International Telecommunication Union, Geneva, Switzerland (May 2003).
U.S. Appl. No. 14/141,201, filed Dec. 26, 2013, Patented.

*Primary Examiner* — Leron Beck
(74) *Attorney, Agent, or Firm* — Leydig, Voit & Mayer, Ltd.

(57) ABSTRACT

Embodiments of the present invention provide a method and a device for determining a transform block size, and can improve image compression efficiency. The method includes: obtaining, according to image block information and a splitting manner of an image block, a parameter of a transform block corresponding to the image block; and obtaining a transform block size according to the parameter of the transform block and the splitting manner of the image block. In the embodiments of the present invention, during determination of a transform block size, the transform block size is obtained according to a splitting manner of an image block and a parameter of a transform block corresponding to
(Continued)

2Nx2N splitting

2NxN splitting the image block. Therefore, a transform block matching the splitting manner of the image block can be used, improving image compression efficiency.

30 Claims, 11 Drawing Sheets

Related U.S. Application Data continuation of application No. PCT/CN2012/074194, filed on Apr. 17, 2012.

(51) Int. Cl.
*H04N 19/122* (2014.01)
*H04N 19/61* (2014.01)
*H04N 19/60* (2014.01)
*H04N 19/96* (2014.01)
*H04N 19/176* (2014.01)

(52) U.S. Cl.
CPC ............. *H04N 19/60* (2014.11); *H04N 19/61* (2014.11); *H04N 19/96* (2014.11)

(58) Field of Classification Search
USPC ........................ 375/240.01–240.29
See application file for complete search history.

(56) References Cited

U.S. PATENT DOCUMENTS

| | | | |
|---|---|---|---|
| 9,560,384 B2* | 1/2017 | Lee | H04N 19/124 |
| 2003/0156648 A1 | 8/2003 | Holcomb et al. | |
| 2007/0025631 A1* | 2/2007 | Kim | H04N 19/119 382/248 |
| 2007/0206679 A1* | 9/2007 | Lim | H04N 19/00 375/240.18 |
| 2010/0086049 A1* | 4/2010 | Ye | H04N 19/176 375/240.16 |
| 2012/0033731 A1 | 2/2012 | Yamamoto et al. | |
| 2012/0201303 A1 | 8/2012 | Yang et al. | |
| 2012/0230411 A1* | 9/2012 | Liu | H04N 19/176 375/240.16 |
| 2013/0003855 A1* | 1/2013 | Park | H04N 19/119 375/240.18 |
| 2013/0022107 A1* | 1/2013 | Van der Auwera | H04N 19/00133 375/240.03 |
| 2013/0177079 A1* | 7/2013 | Kim | H04N 19/00569 375/240.12 |
| 2014/0126632 A1 | 5/2014 | Lu et al. | |

FOREIGN PATENT DOCUMENTS

| | | |
|---|---|---|
| CN | 102045560 A | 5/2011 |
| WO | 2010116869 A1 | 10/2010 |
| WO | 2011005303 A1 | 1/2011 |

* cited by examiner

NxN splitting

2NxnU splitting

2NxnD splitting

METHOD AND DEVICE FOR DETERMINING TRANSFORM BLOCK SIZE

CROSS-REFERENCE TO RELATED APPLICATIONS

This application is a divisional of U.S. application Ser. No. 14/141,201, filed on Dec. 26, 2013, which is a continuation of International Patent Application No. PCT/CN2012/074194, filed on Apr. 17, 2012, which claims priority to Chinese Patent Application No. 201110184380.5, filed on Jul. 1, 2011 and Chinese Patent Application No. 201210019911.X, filed on Jan. 21, 2012, all of which are hereby incorporated by reference in their entireties.

TECHNICAL FIELD

The present invention relates to the field of communications technologies, and in particular, to a method and a device for determining a transform block size.

BACKGROUND

Multiple video compression methods may be used to compress video data in order to minimize bandwidth required for transmitting the video data. The video compression methods include intra-frame compression and inter-frame compression. At present, an inter-frame compression method based on motion estimation is often used. Specifically, a process in which a coding end of an image uses the inter-frame compression method to compress and code the image includes: splitting, by the coding end, a to-be-coded image block into several image sub-blocks of a same size; for each image sub-block, searching a reference image for an image block, which best matches a current image sub-block, as a prediction block; subtracting a pixel value of the prediction block from a corresponding pixel value of the image sub-block to obtain a residual; performing entropy coding on a value obtained after the residual is transformed and quantified; and finally sending, to a decoding end, a bit stream and motion vector information obtained from the entropy coding, where the motion vector information indicates a location difference between the current image sub-block and the prediction block. The decoding end of the image first performs, after obtaining the bit stream from the entropy coding, entropy decoding to obtain the corresponding residual and the corresponding motion vector information; obtains the corresponding matched image block (that is, the prediction block) from the reference image according to the motion vector information; and then adds a value of each pixel point in the matched image block and a value of a corresponding pixel point in the residual to obtain a value of each pixel point in the current image sub-block. Intra-frame prediction is to use information inside a current image to predict an image block to obtain a prediction block. A coding end obtains a pixel corresponding to the prediction block according to a prediction mode, a prediction direction, and pixel values around the image block, and subtracts the pixel of the prediction block from a pixel of the image block to obtain a residual, where the residual is written into a code stream after undergoing transform, quantification, and entropy coding; and a decoding end parses the code stream, obtains a residual block after performing entropy decoding, de-quantification, and de-transform on the code stream, obtains the prediction block according to the prediction mode, the prediction direction, and the pixel values around the image block, and adds a pixel of the residual block and the pixel of the prediction block to obtain a reconstructed image block.

Concepts of a coding unit (coding unit), a prediction unit (prediction unit), and a transform unit (transform unit) exist in an existing video coding and decoding standard. The coding unit is an image block operated during coding at the coding end or decoding at the decoding end. The prediction unit is an image block that has an independent prediction mode in the coding unit. A prediction block is an image block operated during prediction of the coding unit, and one prediction unit may contain multiple prediction blocks. The transform unit is an image block operated during transform of the coding unit, where in this case, the image block may also be called a transform block. Considering that difference signals inside a prediction block are strongly correlated, large-block transform brings higher energy concentration performance than small-block transform. In a broader sense, one image block may contain one or more prediction blocks, and prediction is performed by using a prediction block as a unit at the coding and decoding ends; and one image block contains one or more transform blocks, and prediction is performed by using a transform block as a unit at the coding and decoding ends.

In the existing video coding and decoding standard such as the moving picture experts group (Moving Picture Experts Group, MPEG) or H.264/AVC (Advanced Video Coding, Advanced Video Coding), one image block, called a macroblock (macroblock) or image block, a super-macroblock (super-macroblock) or super image block, or the like, is split into several image sub-blocks. Sizes of these image sub-blocks may be 64×64, 64×32, 32×64, 32×32, 32×16, 16×32, 16×16, 16×8, 8×16, 8×8, 8×4, 4×8, 4×4, and the like. The preceding motion estimation and motion compensation are performed for the image sub-blocks by using these sizes. A coding end of an image needs to send a code word that identifies a splitting manner of the image block to a decoding end of the image, so that the decoding end of the image learns a splitting manner used at the coding end of the image end and determines, according to the splitting manner and motion vector information, a corresponding prediction block. In the existing video coding and decoding standard, each of these image sub-blocks is an N×M (both N and M are an integer greater than 0) rectangular block, and N and M are in a multiple relationship.

In an existing video coding and decoding technology, a transform matrix may be used to remove correlation of a residual of an image block, that is, to remove redundant information of the image block so as to improve coding efficiency. Generally two-dimensional transform is used for transform of a data block in an image block. That is, the coding end multiplies residual information of the data block by one N×M transform matrix and a transpose matrix of the N×M transform matrix to obtain a transform coefficient. The preceding step may be described by using the following formula:

$$f = T' \times C \times T$$

where C represents residual information of a data block, T and T' represent a transform matrix and a transpose matrix of the transform matrix, and f represents a transform coefficient matrix obtained after the residual information of the data block is transformed. The transform matrix may be a discrete cosine transform (Discrete Cosine Transform, DCT) matrix, an integer transform (Integer Transform) matrix, a KL transform (Karhunen Loeve Transform, KLT) matrix, or the like. KLT can better consider texture information of an image block or an image block residual and therefore using KLT may achieve a better effect.

Performing the preceding processing on residual information of an image block is equivalent to transforming the residual information of the image block from a space domain to a frequency domain, and the transform coefficient matrix f obtained after the transform is concentrated in a low-frequency area. After performing the preceding transform of the residual information of the image block, the coding end performs processing such as quantification and entropy coding on the transform coefficient matrix obtained after the transform, and sends, to the decoding end, a bit stream obtained from the entropy coding. To make the decoding end learn a type and a size of a transform matrix used at the coding end, generally the coding end sends, to the decoding end, indication information that indicates a transform matrix used by a current image block.

Subsequently the decoding end determines, according to the indication information, the transform matrix used at the coding end; decodes, according to a characteristic (such as orthogonality of the transform matrix) of the transform matrix, the bit stream sent by the coding end, to obtain the transform coefficient matrix; multiplies the transform coefficient matrix by the transform matrix and the transpose matrix of the transform matrix, to restore and obtain residual information of a data block that is approximately consistent with that at the decoding end. The preceding step may be described by using the following formula:

$$C = T \times f \times T'$$

where C represents residual information of a data block, T and T' represent a transform matrix and a transpose matrix of the transform matrix, and f represents a transform coefficient matrix obtained by the decoding end.

Because different regularities of distribution may exist for a residual of an image block, a good transform effect often cannot be achieved by using a transform matrix of a specific size. Therefore, in the prior art, transform matrices (also called transform blocks) of different sizes are used for the residual of the image block. For this reason, for a 2N×2N image block, a transform matrix whose size is 2N×2N may be used, or transform matrices whose sizes are N×N or transform matrices whose sizes are 0.5N×0.5N may be used.

Currently, however, only a transform matrix of a square size is used. For striped texture that frequently appears, a transform matrix of a square size cannot effectively remove redundant information of an image block, thereby lowering image compression efficiency.

SUMMARY

Embodiments of the present invention provide a method and a device for determining a transform block size, which can improve image compression efficiency.

In one aspect, a method for determining a transform block size is provided, including: obtaining, according to image block information and a splitting manner of an image block, a parameter of a transform block corresponding to the image block; and obtaining a size of the transform block according to the parameter of the transform block and the splitting manner of the image block.

In another aspect, an image coding method is provided, including: obtaining at least one candidate transform block size according to a parameter of a transform block corresponding to an image block; determining a serial number of the at least one candidate transform block size; and selecting one of candidate transform block sizes as a size of the transform block corresponding to the image block.

In another aspect, an image decoding method is provided, including: obtaining at least one candidate transform block size according to a parameter of a transform block corresponding to an image block; determining a serial number of the at least one candidate transform block size; obtaining a serial number of a transform block size of the transform block; and obtaining the transform block size according to the serial number of the transform block size.

In another aspect, a device for determining a transform block size is provided, including: a parameter acquiring unit, configured to obtain, according to image block information and a splitting manner of an image block, a parameter of a transform block corresponding to the image block; and a size acquiring unit, configured to obtain a size of the transform block according to the parameter of the transform block and the splitting manner of the image block.

In another aspect, an image coding device is provided, including: an acquiring unit, configured to obtain at least one candidate transform block size according to a parameter of a transform block corresponding to an image block; a determining unit, configured to determine a serial number of the at least one candidate transform block size; and a coding unit, configured to select one of candidate transform block sizes as a size of the transform block corresponding to the image block and code a serial number of the size of the transform block.

In another aspect, an image decoding device is provided, including: an acquiring unit, configured to obtain at least one candidate transform block size according to a parameter of a transform block corresponding to an image block; a determining unit, configured to determine a serial number of the at least one candidate transform block size; and a decoding unit, configured to obtain a serial number of a transform block size of the transform block and obtain the transform block size according to the serial number of the transform block size.

In the embodiments of the present invention, during determination of a transform block size, the transform block size is obtained according to a splitting manner of an image block and parameter of a transform block corresponding to the image block. Therefore, a transform block matching the splitting manner of the image block can be used, improving image compression efficiency.

BRIEF DESCRIPTION OF DRAWINGS

To illustrate the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

FIG. 1a to FIG. 1d are schematic diagrams of examples of a symmetrical splitting manner of an image block.

Figure 1A:
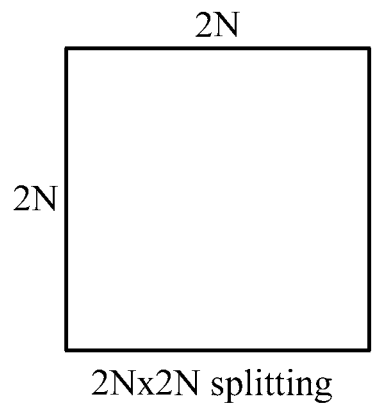
FIG. 1a to FIG. 1d are schematic diagrams of examples of a symmetrical splitting manner of an image block.
Figure 1B:
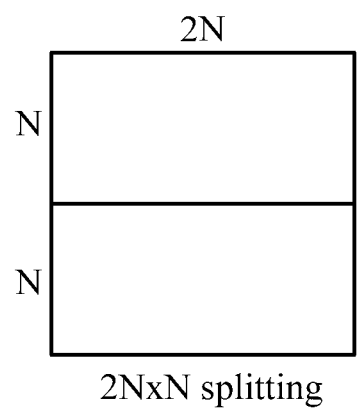
Figure 1C:
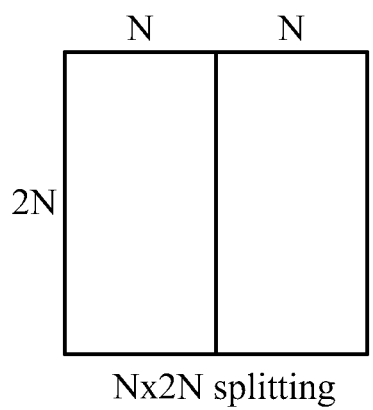
Figure 1D:
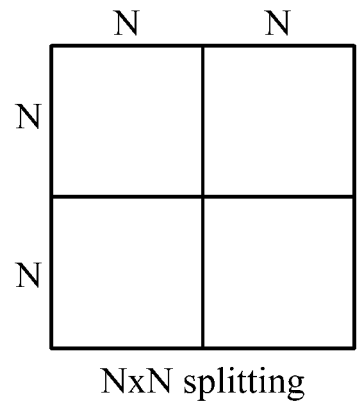

Common manners of splitting an image block into an image sub-block are as follows: a 2N×2N splitting manner, in which an image block contains only one image sub-block, that is, the image block is not split into smaller image sub-blocks, as shown in FIG. 1a; a 2N×N splitting manner, in which an image block is split into one upper image sub-block and one lower image sub-block of a same size, as shown in FIG. 1b; an N×2N splitting manner, in which an image block is split into one left image sub-block and one right image sub-block of a same size, as shown in FIG. 1c; and an N×N splitting manner, in which an image block is split into four image sub-blocks of a same size, as shown in FIG. 1d. N is any positive integer and indicates the number of pixels.

FIG. 2a to FIG. 2d are schematic diagrams of examples of an asymmetrical splitting manner of an image block.

An asymmetrical splitting manner may also adopted for an image block, as shown in FIG. 2a to FIG. 2d. In splitting manners shown in FIG. 2a and FIG. 2b, one image block is split into one upper rectangular image sub-block and one lower rectangular image sub-block of different sizes. For two image sub-blocks split in a 2N×nU splitting manner (n=0.5 N) shown in FIG. 2a, two side lengths of an upper image sub-block are 2N and 0.5N, and two side lengths of a lower image sub-block are 2N and 1.5N. Generally, in 2N×nU, U indicates that an image splitting line shifts upward relative to a perpendicular bisector of the image block. 2N×nU indicates that the image splitting line shifts upward by n relative to the perpendicular bisector of the image block, where n=x×N and x is greater than or equal to 0 and smaller than or equal to 1.

Figure 2A:
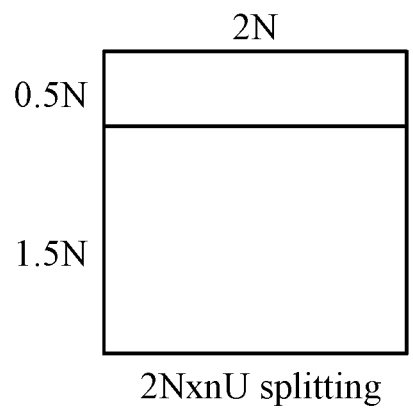
FIG. 2a to FIG. 2d are schematic diagrams of examples of an asymmetrical splitting manner of an image block.
Figure 2B:
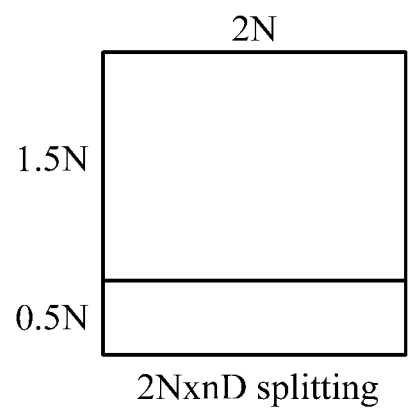

For two image sub-blocks split in a 2N×nD splitting manner (n=0.5 N) shown in FIG. 2b, two side lengths of an upper image sub-block are 2N and 1.5N, and two side lengths of a lower image sub-block are 2N and 0.5N. Generally, in 2N×nD, D indicates that an image splitting line shifts downward relative to a perpendicular bisector of the image block. 2N×nD indicates that the image splitting line shifts downward by n relative to the perpendicular bisector of the image block, where n=x×N and x is greater than or equal to 0 and smaller than or equal to 1.

Figure 2C:
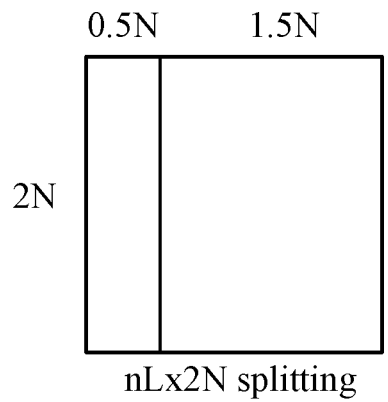
Figure 2D:
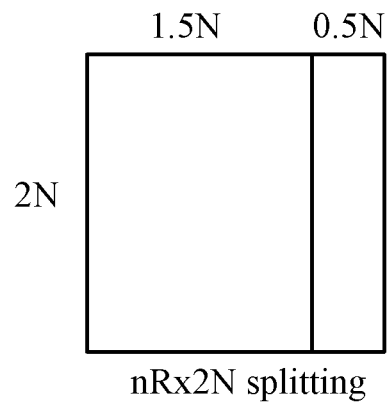

In splitting manners shown in FIG. 2c and FIG. 2d, one image block is split into one left rectangular image sub-block and one right rectangular image sub-block of different sizes. For two image sub-blocks split in an nL×2N splitting manner (n=0.5 N) shown in FIG. 2c, two side lengths of a left image sub-block are 0.5N and 2N, and two side lengths of a right image sub-block are 1.5N and 2N. Generally, in nL×2N, L indicates that an image splitting line shifts leftward relative to a perpendicular bisector of the image block. nL×2N indicates that the image splitting line shifts leftward by n relative to the perpendicular bisector of the image block, where n=x×N and x is greater than or equal to 0 and smaller than or equal to 1.

For two image sub-blocks split in an nR×2N splitting manner (n=0.5 N) shown in FIG. 2d, two side lengths of a left image sub-block are 1.5N and 2N, and two side lengths of a right image sub-block are 0.5N and 2N. Generally, in nR×2N, R indicates that an image splitting line shifts rightward relative to a perpendicular bisector of the image block. nR×2N indicates that the image splitting line shifts rightward by n relative to the perpendicular bisector of the image block, where n=x×N and x is greater than or equal to 0 and smaller than or equal to 1.

The preceding splitting manners of an image block may also be represented by using types of prediction blocks. 2N×2N, 2N×N, N×2N, 2N×nU, 2N×nD, nL×2N, and nR×2N all indicate types of prediction blocks corresponding to the image block splitting manners.

Figure 3A:
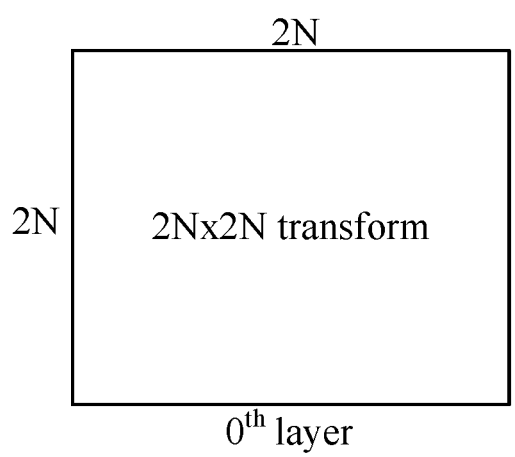
FIG. 3a to FIG. 3c are schematic diagrams of transform blocks corresponding to different layer numbers.
Figure 3B:
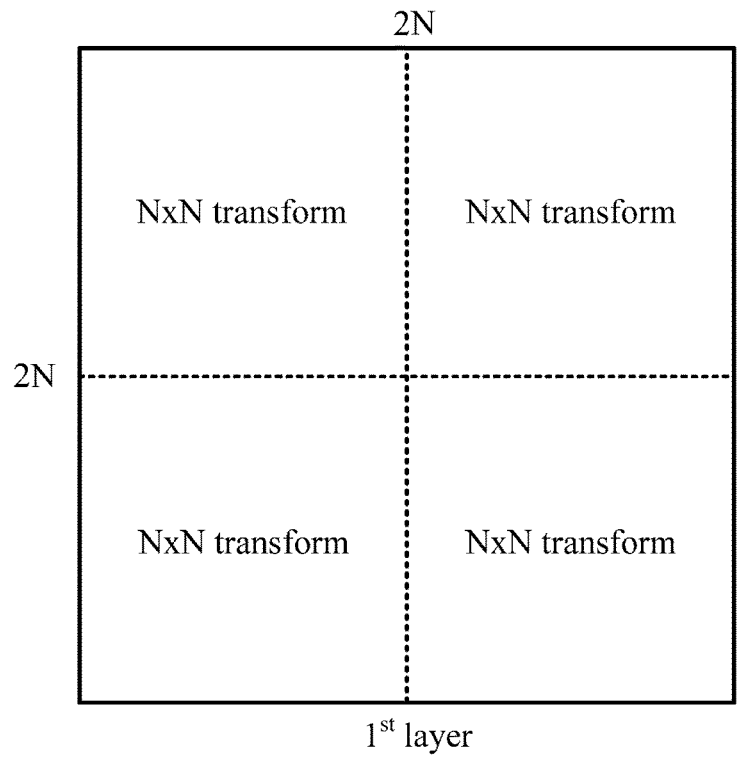
Figure 3C:
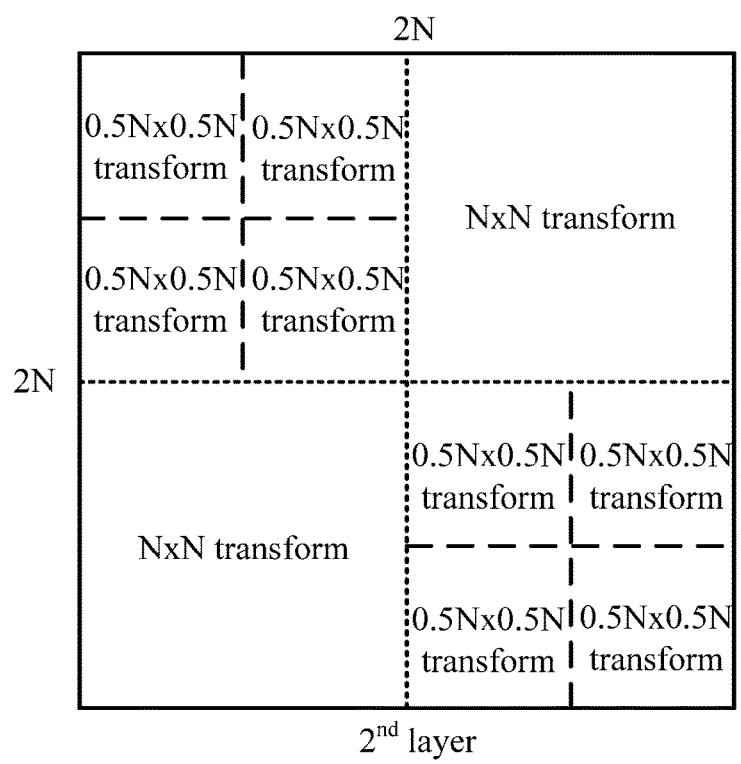

To effectively indicate how transform matrices of different sizes are used for an image block, a tree identification method may be used to identify transform blocks layer by layer. FIG. 3a to FIG. 3c are schematic diagrams of transform blocks corresponding to different layer numbers.

As shown in FIG. 3a to FIG. 3c, during identification of a size of a transform block used by an image block, a 0th layer of a code steam has an indicating bit used to identify whether a transform matrix whose size is 2N×2N is used for the image block. If the transform matrix whose size is 2N×2N (as shown in FIG. 3a) is used for the image block, the indicating bit is 0. If 2N×2N transform is not used for the image block, the indicating bit is 1, indicating that the transform matrix whose size is 2N×2N needs to be further split into four transform matrices whose sizes are N×N, and four bits are used in a first-layer structure of the code stream to each identify whether to further split each transform matrix whose size is N×N. If a transform structure shown in FIG. 3b is used for the image block, all the four bits are 0, indicating that the each transform matrix whose size is N×N is not further split.

When a transform structure shown in FIG. 3c is used, in the four bits, two bits are 0 and the rest two bits are 1. The two bits being 0 indicate that a lower left transform matrix and an upper right transform matrix whose sizes are N×N are not further split. The two bits being 1 indicate that an upper left transform matrix and a lower right transform matrix whose sizes are N×N need to be further split to obtain transform matrices whose sizes are 0.5N×0.5N. Then in a second-layer structure of the code stream, four bits are used to indicate whether upper left transform matrices whose sizes are 0.5N×0.5N need to be further split; and four bits are used to indicate whether lower right transform matrices whose sizes are 0.5N×0.5N need to be further split. If the transform structure shown in FIG. 3c is used for the image block, all the 4+4 bits are 0, indicating that no further splitting is performed. The preceding layer-by-layer identification in the code stream may effectively and indicate transform blocks sizes used by the image block and the image sub-blocks.

There is also a method for determining a transform block size according to a type of a prediction block used by the image block, in addition to the preceding method for identifying, layer by layer, layer numbers and sizes corresponding to transform blocks. Different types of prediction blocks correspond to different image block splitting manners, and a prediction block may be obtained according to a splitting manner of the image block. For example, the 2N×N splitting manner indicates that a size of a corresponding prediction block is 2N×N (as shown in FIG. 1b).

In a video coding and decoding technology, usually leaping transform may exist for residual data corresponding to boundaries of two prediction blocks. Therefore, if a transform matrix crosses the boundaries of the two prediction blocks, a transform effect weakens; correlation of a residual of an image block cannot be effectively removed; redundant information of the image block cannot be effectively removed; and coding efficiency is lowered. FIG. 4a to FIG. 4d are schematic diagrams of determining a transform block size according to a type of a prediction block.

As shown in FIG. 4a to FIG. 4d, when types of prediction blocks 2N×2N, 2N×N, N×2N, and N×N are used for an image block, transform blocks corresponding to an image are of 2N×2N, N×N, N×N, and N×N transform, respectively. A purpose of this method is to ensure that a transform block does not cross a boundary of a prediction block, thereby ensuring coding efficiency. Therefore, when the types of prediction blocks 2N×N, N×2N, and N×N are used for the image block, four N×N transform blocks are used for the image. This method is generally called an implicit splitting method (implicit splitting).

Figure 4A:
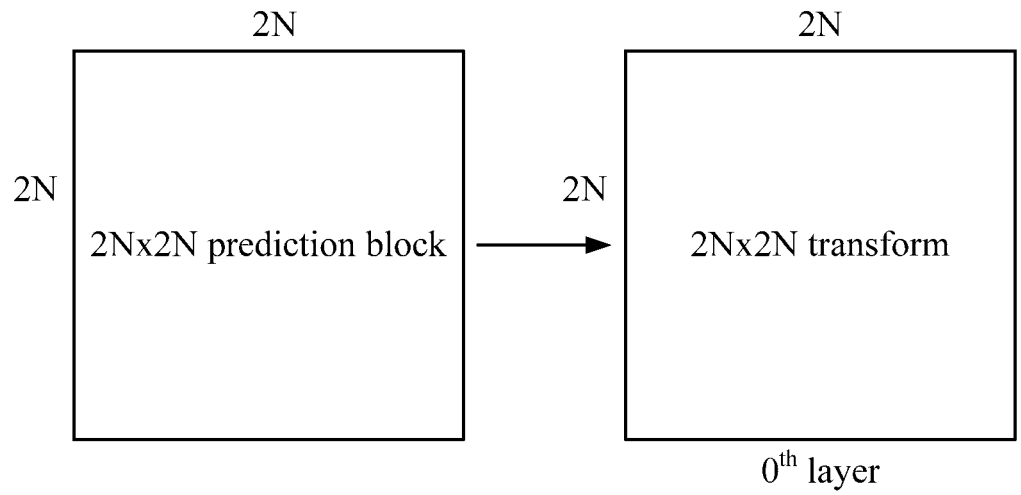
FIG. 4a to FIG. 4d are schematic diagrams of determining a transform block size according to a type of prediction block.
Figure 4B:
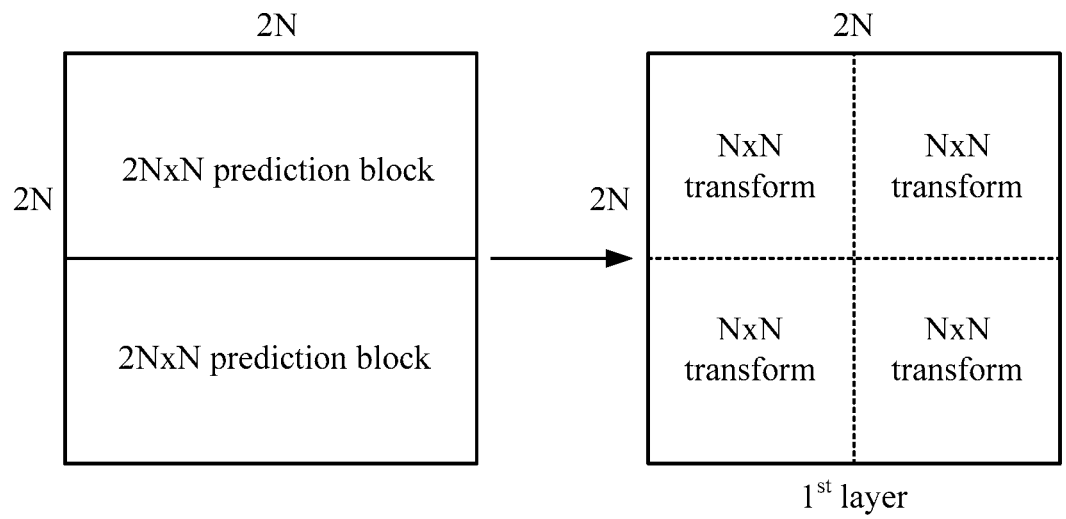
Figure 4C:
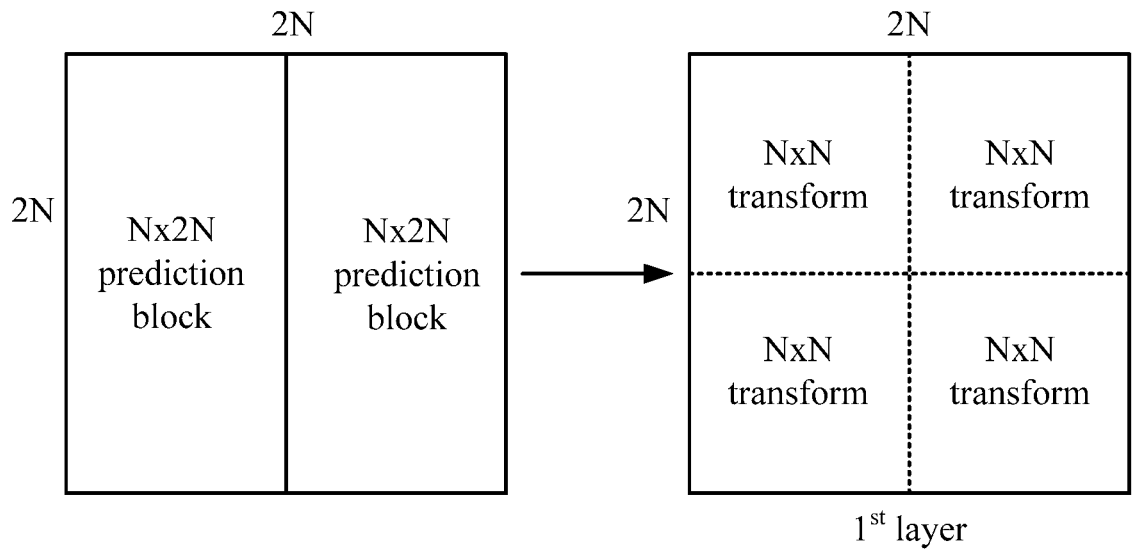
Figure 4D:
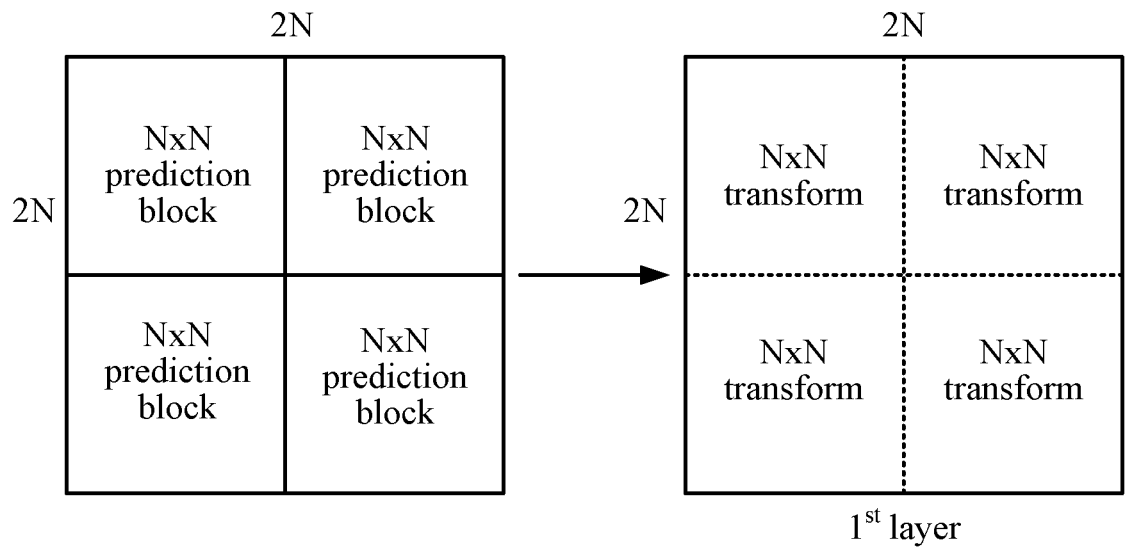

In a method of using layer-by-layer identification and implicit splitting, a size of a transform matrix is not correlated to a size of a prediction block at all. As shown in FIG. 4b, when the 2N×N splitting manner is used for a 2N×2N image block, because a splitting manner reflects texture information of an area where an image block is located, texture of the area where the image block is located tends more to have a horizontal texture characteristic but N×N transform blocks still are used for the image block at this time.

Because the size of the transform matrix is not correlated to the size of the prediction block, the transform matrix does not use information of the prediction block to effectively remove redundant information of the image block, thereby affecting coding efficiency. In the embodiment of the present invention, a transform block of an appropriate splitting manner is used during determination of the transform block size, thereby improving image compression efficiency.

Figure 5:
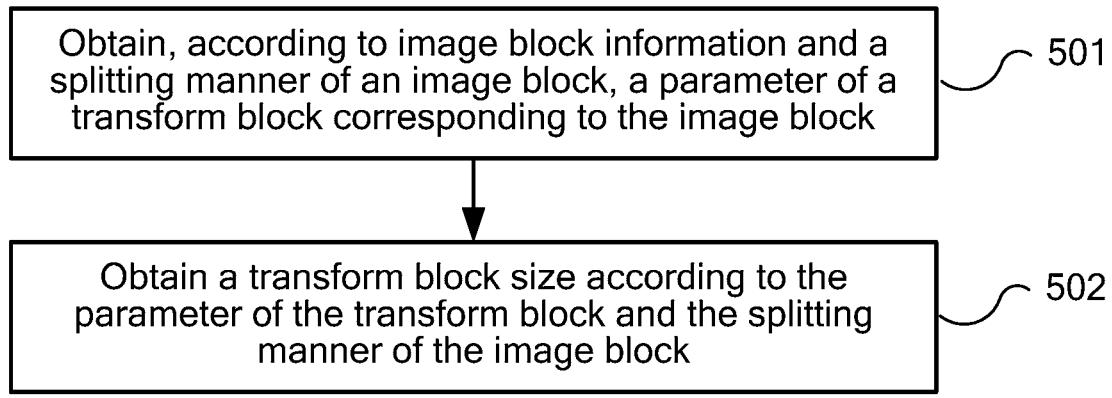
FIG. 5 is a flowchart of a method for determining a transform block size according to an embodiment of the present invention.

FIG. 5 is a flowchart of a method for determining a transform block size according to an embodiment of the present invention.

501. Obtain, according to image block information and a splitting manner of an image block, a parameter of a transform block corresponding to the image block.

Optionally, in an embodiment, the parameter of the transform block includes a layer number (trafoDepth for short) corresponding to the transform block or an indication value (log 2TrafoSize for short) of a transform block size.

For example, a relationship between the transform block size and the indication value of the transform block size may be expressed by using the following formula:

Transform block size=$2^{log\ 2TrafoSize}$, or expressed as 1<<log 2TrafoSize by using a shift method, where "<<" represents a left shift operation.

Optionally, in another embodiment, the image block information may include a size of the image block, an indication value of the size of the image block, a layer number of the image block, or a serial number of the size of the image block. These image block information forms correspond to each other, and the indication value (log 2CUSize for short) of the size of the image block may be directly or indirectly obtained. For example, a relationship between the size of the image block and the indication value of the size of the image block may be expressed by using the following formula:

Size of the image block=$2^{log\ 2CUSize}$ or expressed as 1<<log 2CUSize by using the shift method, where "<<" represents a left shift operation.

In the following text, for brief description, the indication value log 2CUSize of the size of the image block is used as an example of the image block information for description. The embodiment of the present invention, however, is not limited to this, and the image block information may include other forms.

Optionally, in an embodiment, the indication value of the transform block size is equal to the indication value of the size of the image block minus the layer number corresponding to the transform block: log 2TrafoSize=log 2CUSize−trafoDepth; or the indication value of the transform block size is equal to the indication value of the size of the image block minus m1, where m1 is a positive integer: log 2TrafoSize=log 2CUSize−m1; or the indication value of the transform block size is equal to the indication value of the size of the image block minus the layer number corresponding to the transform block and then minus m2, where m2 is a positive integer: log 2TrafoSize=log 2CUSize−trafoDepth−m2.

In addition, a prediction block may be obtained according to the splitting manner of the image block.

502. Obtain the transform block size according to the parameter of the transform block and the splitting manner of the image block.

Optionally, in an embodiment, a first size of the transform block may be obtained according to the parameter of the transform block. For example, when the parameter is the layer number trafoDepth corresponding to the transform block, first size=$2^{log\ 2CUSize-trafoDepth}$ or first size=1<<(log 2TrafoSize−trafoDepth); or when the parameter is the indication value log 2TrafoSize of the transform block size, first size=$2^{log\ 2TrafoSize}$ or first size=1<<log 2TrafoSize.

During determination of the transform block size, the transform block size is determined according to the first size. For example, a horizontal size of the transform block is equal to h times the first size, and a vertical size of the transform block is equal to v times the first size, where h and v are greater than 0. For example, when a horizontal size of the prediction block is greater than a vertical size of the prediction block, h is greater than v; or when a horizontal size of the prediction block is smaller than a vertical size of the prediction block, h is smaller than v; or when a horizontal size of the prediction block is equal to a vertical size of the prediction block, h is equal to v.

According to the embodiment of the present invention, during determination of a transform block size, the transform block size is obtained according to a splitting manner of an image block and a parameter of a transform block corresponding to the image block. Therefore, a transform block matching the splitting manner of the image block can be used, improving image compression efficiency.

The method in FIG. 5 may be used in an image coding and decoding process. For example, in a coding process, the transform block size obtained by using the method described in FIG. 5 may be coded, and a coding result is written into a code stream. In another aspect, in a decoding process, the coding result may be obtained by parsing the code stream, and the corresponding transform block size may be obtained according to the method described in FIG. 5.

The following describes the embodiment of the present invention with more details by combining specific examples.

Figure 6A:
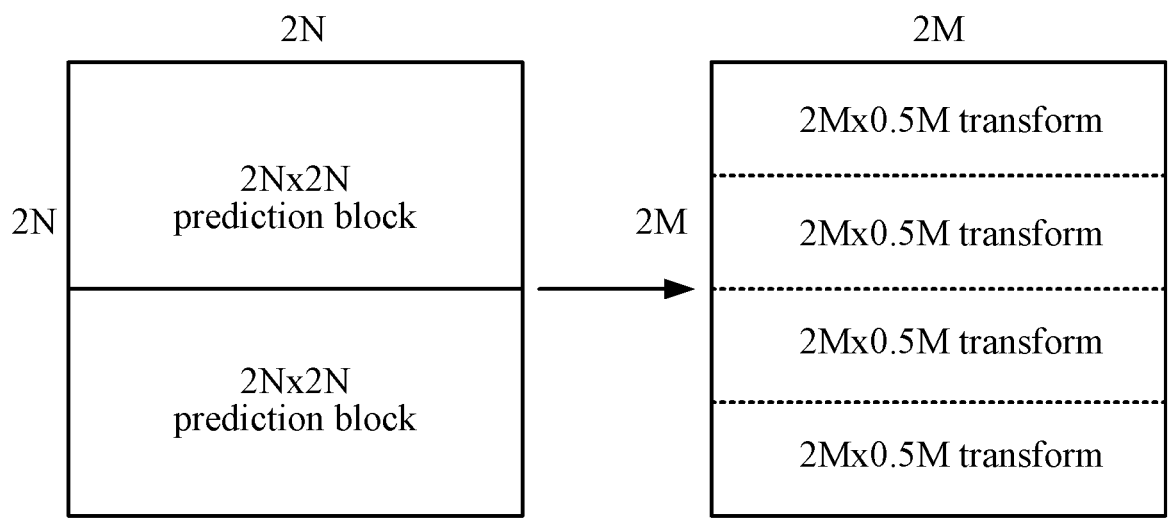
FIG. 6a and FIG. 6b are schematic diagrams of transform blocks according to an embodiment of the present invention.
Figure 6B:
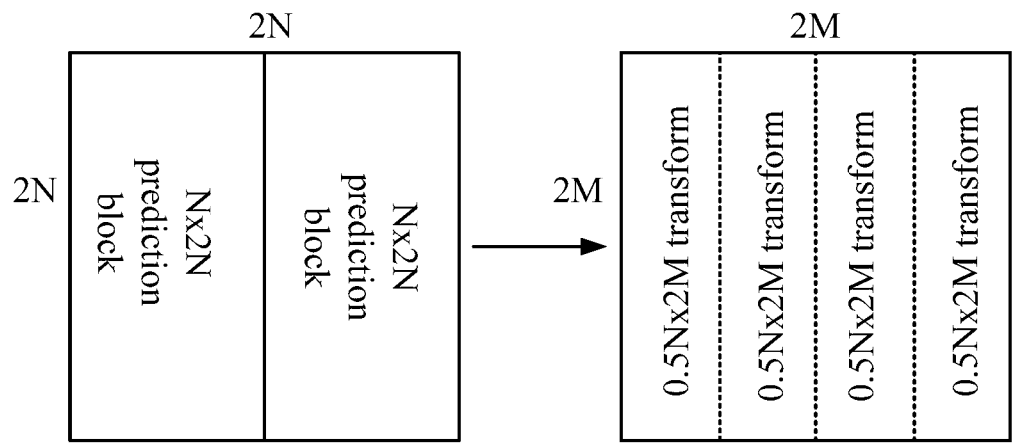

FIG. 6a and FIG. 6b are schematic diagrams of transform blocks according to an embodiment of the present invention. The following describes this embodiment by combining FIG. 1a to FIG. 1d.

In this embodiment, a layer number trafoDepth corresponding to a transform block is used as a parameter of the transform block. First, a size of an image block is determined as 2M×2M, 2M is indicated by using a parameter log 2CUSize, and a relationship between the two is 2M=1<<log 2CUSize.

Then a number trafoDepth of a layer where a transform block corresponding to the image block is located is determined according to a splitting manner of the image block. As shown in FIG. 1a, the image block is split by using 2N×2N, and its splitting manner is 2N×2N. In this case, a transform block corresponding to the image block is located in a 0th layer, and a value of trafoDepth is 0. As shown in FIG. 1b, the image block is split by using 2N×N, and its splitting manner is 2N×N. In this case, transform blocks corresponding to the image block are located in a first layer, and the value of trafoDepth is 1. As shown in FIG. 1c, the image block is split by using N×2N, and its splitting manner is N×2N. In this case, transform blocks corresponding to the image block are located in the first layer, and the value of trafoDepth is 1. As shown in FIG. 1d, the image block is split by using N×N, and its splitting manner is N×N. In this case, transform blocks corresponding to the image block are located in the first layer, and the value of trafoDepth is 1. In this case, a first size is 1<<(log 2CUSize−trafoDepth).

A length and a width of the transform block are determined according to the preceding determined number of the layer where the transform block corresponding to the image block is located and the splitting manner used for the image block. As shown in FIG. 1a, the 2N×2N splitting manner is used for the image block, and in this case a layer number corresponding to the transform block is 0. A size of the transform block corresponding to the image block is consistent with the size of the image block and still 2M×2M (h=2, v=2). That is, in this case the size of the transform block is (1<<log 2CUSize)×(1<<log 2CUSize).

As shown in FIG. 1b, the 2N×N splitting manner is used for the image block, and in this case a layer number corresponding to the transform blocks is 1. In this case, image texture corresponding to an area where the image block is located tends more to be horizontal image texture, and using 2N×0.5N transform blocks can better improve coding efficiency than using N×N transform blocks.

In this embodiment, when the 2N×N splitting manner is used for the image block, the transform blocks use 2M×0.5M transform (h=2, v=2) shown in FIG. 6a. That is, horizontal sizes of the transform blocks are consistent with a horizontal size of the image block, and vertical sizes of the transform blocks are one fourth of a vertical size of the image block. If the parameters log 2CUSize and trafoDepth are used for indication, a transform block size corresponding to the 2N×N splitting manner is (1<<log 2CUSize)×(1<<(log 2CUSize−trafoDepth−1)), or (1<<log 2CUSize)×((1<<log 2CUSize)>>(trafoDepth+1)).

Similarly, when the N×2N splitting manner shown in FIG. 1c is used for the image block, a layer number corresponding to the transform blocks is 1 and image texture corresponding to an area where the image block is located tends more to be vertical image texture. Using 0.5M×2M transform blocks can better improve coding efficiency than using N×N transform blocks. Therefore, in the present invention, when the N×2N splitting manner is used for the image block, the transform blocks use 0.5M×2M transform (h=0.5, v=2) shown in FIG. 6b. That is, horizontal sizes of the transform blocks are one fourth of a horizontal size of the image block, and vertical sizes of the transform blocks are consistent with a vertical size of the image block. If the parameters log 2CUSize and trafoDepth are used for indication, a size of a transform block corresponding to the N×2N splitting manner is (1<<(log 2CUSize−trafoDepth−1))×(1<<log 2CUSize) or ((1<<log 2CUSize)>>(trafoDepth+1))×(1<<log 2CUSize).

As shown in FIG. 1d, the N×N splitting manner is used for the image block and a layer number corresponding to the transform blocks is 1. The N×N splitting manner spits the 2N×2N image block into four square prediction blocks of a same size along a horizontal direction and a vertical direction, and texture information of an area where the image block is located cannot be determined according to sizes of the prediction blocks. Therefore, a size of a transform block corresponding to an N×N prediction block is M×M (h=1, v=1). That is, both a horizontal size and a vertical size of the transform block are half of the size of the image block. The parameters log 2CUSize and trafoDepth are used for indication. In this case, a transform block size corresponding to the N×N splitting manner is (1<<(log 2CUSize−trafoDepth))×(1<<(log 2CUSize−trafoDepth)), or ((1<<log 2CUSize)>>trafoDepth)×((1<<log 2CUSize)>>trafoDepth).

Specifically, when the size of the image block is 32×32, according to the preceding method, firstly, layer numbers trafoDepth corresponding to the splitting manners 2N×2N, 2N×N, N×2N, and N×N are obtained as 0, 1, 1, and 1 respectively; and transform block sizes obtained according to the splitting manners are 32×32, 32×8, 8×32, and 16×16.

According to the embodiments of the present invention, during determination of a transform block size, the transform block size is obtained according to a splitting manner of an image block and a parameter of a transform block corresponding to the image block. Therefore, a transform block matching the splitting manner of the image block can be used, improving image compression efficiency.

The following describes another embodiment of the present invention. In this embodiment, a parameter of a transform block is an indication value log 2TrafoSize of a transform block size.

First, a size of an image block is determined as 2M×2M, 2M is indicated by using a parameter log 2CUSize, and a relationship between the two is 2M=1<<log 2CUSize. An initial value of log 2TrafoSize is log 2CUSize, and log 2TrafoSize corresponding to different layer numbers may be obtained according to log 2TrafoSize=log 2CUSize−trafoDepth.

Then a numerical value of log 2TrafoSize of a transform block corresponding to the image block is determined according to a splitting manner of the image block. As shown in FIG. 1a, the image block is split by using 2N×2N, and its splitting manner is 2N×2N. In this case, a value of log 2TrafoSize of a transform block corresponding to the image block does not change. That is, log 2TrafoSize is equal to the initial value log 2CUSize. As shown in FIG. 1b, the image block is split by using 2N×N, and its splitting manner is 2N×N. In this case, the value of log 2TrafoSize of a transform block corresponding to the image block decreases by 1, that is, log 2TrafoSize=log 2CUSize−1. As shown in FIG. 1c, the image block is split by using N×2N, and its splitting manner is N×2N. In this case, the value of log 2TrafoSize of a transform block corresponding to the image block decreases by 1, that is, log 2TrafoSize=log 2CUSize−1. As shown in FIG. 1d, the image block is split by using N×N, and its splitting manner is N×N. In this case, the value of log 2TrafoSize of a transform block corresponding to the image block decreases by 1, that is, log 2TrafoSize=log 2CUSize−1.

Here, the preceding log 2TrafoSize=log 2CUSize−1 may be based on a formula log 2TrafoSize=log 2CUSize−m1 (m1=1), or based on a formula log 2TrafoSize=log 2CUSize−trafoDepth. Similar to the description in the first embodiment, a layer number corresponding to transform blocks of splitting manners 2N×N, N×2N, and N×N are trafoDepth=1.

According to the preceding principle, a length and a width of the transform block are determined according to the determined parameter log 2TrafoSize of the transform block and the splitting manner used by the image block. The length of the transform block refers to a size of the transform block in a horizontal direction; and the width of the transform block refers to a size of the transform block in a vertical direction.

In this case, a first size is 1<<log 2TrafoSize. As shown in FIG. 1a, the 2N×2N splitting manner is used for the image block, and a size of the transform block corresponding to the image block is consistent with the size of the image block and is still 2M×2M (h=2, v=2). That is, the size of the transform block is (1<<log 2TrafoSize)×(1<<log 2TrafoSize). As shown in FIG. 1b, the 2N×N splitting manner is used for the image block. In this case, the transform blocks use 2M×0.5M transform (h=2, v=0.5) shown in FIG. 6a. That is, horizontal sizes of the transform blocks are consistent with a horizontal size of the image block, and vertical sizes of the transform blocks are one fourth of a vertical size of the image block. If the parameter log 2TrafoSize is used for indication, a transform block size corresponding to the 2N×N splitting manner is (1<<(log 2TrafoSize+1))×(1<<(log 2TrafoSize−1)). Similarly, when the N×2N splitting manner shown in FIG. 1c is used for the image block, the transform blocks use 0.5M×2M transform (h=0.5, v=0.5) shown in FIG. 6b. That is, horizontal sizes of the transform blocks are one fourth of a horizontal size of the image block, and vertical sizes of the transform blocks are consistent with a vertical size of the image block. The parameter log 2TrafoSize is used for indication. In this case, a transform block size corresponding to the N×2N splitting manner is (1<<(log 2TrafoSize−1))×(1<<(log 2TrafoSize+1)).

As shown in FIG. 1d, the N×N splitting manner is used for the image block, and a transform block size is M×M (h=1, v=1). That is, both a horizontal size and a vertical size of the transform block are half of the size of the image block. The parameter log 2TrafoSize is used for indication. In this case, a transform block size corresponding to the N×N splitting manner is (1<<log 2TrafoSize)×(1<<log 2TrafoSize).

Specifically, when the image block size is 32×32, according to the preceding method, the value of log 2CUSize is 5, and the initial value of log 2TrafoSize is 5; values 5, 4, 4, and 4 of log 2TrafoSize corresponding to the splitting manners 2N×2N, 2N×N, N×2N, and N×N are obtained at first; and transform block sizes obtained according to the splitting manners are 32×32, 32×8, 8×32, and 16×16.

According to the embodiment of the present invention, during determination of a transform block size, the transform block size is obtained according to a splitting manner of an image block and a parameter of a transform block corresponding to the image block. Therefore, a transform block matching the splitting manner of the image block can be used, improving image compression efficiency.

The following describes another embodiment of the present invention. Similar to the previous embodiment, a size of an image block is determined as 2M×2M, 2M is indicated by using a parameter log 2CUSize, and a relationship between the two is 2M=1<<log 2CUSize. It is assumed that a parameter used to identify basic information of a transform block size is log 2TrafoSize, and an initial value of log 2TrafoSize is log 2CUSize. In this embodiment, before 501 in FIG. 5, a splitting flag value (hereinafter referred to as InterSplitFlag) is obtained according to a splitting manner and a hierarchy flag value (hereinafter referred to as max_transform_hierarchy_depth_inter). The hierarchy flag value is used to indicate whether a layer-by-layer identification manner is used for a transform block, and it is determined, based on the splitting flag value, whether to determine the transform block size according to a splitting manner of the image block.

In a video coding and decoding method, for one image block, image block data is usually transformed by attempting to use transform blocks of different sizes, and the preceding layer-by-layer identification method is used for identify a number of a layer where a transform block is located or a size of a transform block. In addition, in the video coding and decoding method, for one image block, image block data may also be transformed by using a transform block of only one size, that is, without using the preceding layer-by-layer identification method to identify the size of the transform block or the number of the layer where the transform block is located. When the two methods are simultaneously used in a video coding and decoding standard or system, usually a parameter is used for identify the two methods. It is assumed that the parameter is max_transform_hierarchy_depth_inter. When a coding end identifies a value of max_transform_hierarchy_depth_inter in a code stream as 1, it indicates that transform blocks of multiple sizes are used for an image block at the coding end to transform image block data and the preceding layer-by-layer identification method is used for identify a number of a layer where a transform block is located or a size of a transform block; or when the coding end identifies the value of max_transform_hierarchy_depth_inter in the code stream as 0, it indicates that a transform block of one size is used for the image block at the coding end to transform image block data; and when a decoding end parses the code stream and obtains a value of max_transform_hierarchy_depth_inter which is 1, it indicates that the layer-by-layer identification method is used for an image block at the decoding end to obtain a number of a layer where a transform block is located or a size of a transform block; or when the decoding end parses the code stream and obtains a value of max_transform_hierarchy_depth_inter which is 0, it indicates that a transform block of one size is used for the image block at the decoding end to transform image block data.

A method of determining a numerical value of log 2TrafoSize of a transform block corresponding to an image block according to a splitting manner of the image block is as follows:

First, a value of the variable InterSplitFlag is obtained according to the following table:

| InterSplitFlag | Splitting Manner of the Image Block |
|---|---|
| 0 | 2N × 2N |
| !(max_transform_hierarchy_depth_inter) | 2N × N |
| !(max_transform_hierarchy_depth_inter) | N × 2N |
| !(max_transform_hierarchy_depth_inter) | N × N |
| !(max_transform_hierarchy_depth_inter) | 2N × nU |
| !(max_transform_hierarchy_depth_inter) | 2N × nD |
| !(max_transform_hierarchy_depth_inter) | nL × 2N |
| !(max_transform_hierarchy_depth_inter) | nR × 2N |

For example, the preceding splitting manners 2N×nD, 2N×nU, nL×2N, and nR×2N correspond to splitting shown in FIG. 2a, FIG. 2b, FIG. 2c, and FIG. 2d respectively, where n=0.5 N.

When the value of InterSplitFlag is 0, the value of max_transform_hierarchy_depth_inter is not 0, and the preceding layer-by-layer identification method is used for determine the value of log 2TrafoSize, a formula log 2TrafoSize=log 2CUSize−trafoDepth may be used. For example, when the transform block is located in a 0th layer, the value of log 2TrafoSize does not change, that is, log 2TrafoSize=log 2CUSize; when the transform block is located in a $1^{st}$ layer, the value of log 2TrafoSize decreases by 1 as compared with the value of log 2TrafoSize in the 0th layer, that is, log 2TrafoSize=log 2CUSize−1; when the transform block is located in a $2^{nd}$ layer, the value of log 2TrafoSize decreases by 1 as compared with the value of log 2TrafoSize in the Pt layer, that is, log 2TrafoSize=log 2CUSize−2; and the rest can be deduced by analogy, so as to obtain a value of log 2TrafoSize. When the value of InterSplitFlag is 0 and the value of max_transform_hierarchy_depth_inter is 0, the preceding implicit splitting method (implicit split) is used to determine a size of a transform block. For example, when the value of max_transform_hierarchy_depth_inter is 0, a value of log 2TrafoSize of a transform block corresponding to the 2N×2N splitting manner is log 2CUSize and the size is 2M×2M.

When the value of InterSplitFlag is 1, as shown in FIG. 1b, the image block is split by using 2N×N, and its splitting manner is 2N×N. In this case, a value of log 2TrafoSize of a transform block corresponding to the image block decreases by 1, that is, log 2TrafoSize=log 2CUSize−1. As shown in FIG. 1c, the image block is split by using N×2N, and its splitting manner is N×2N. In this case, the value of log 2TrafoSize of a transform block corresponding to the image block decreases by 1, that is, log 2TrafoSize=log 2CUSize−1. As shown in FIG. 1d, the image block is split by using N×N, and its splitting manner is N×N. In this case, the value of log 2TrafoSize of a transform block corresponding to the image block decreases by 1, that is, log 2TrafoSize=log 2CUSize−1. In this case, a first size is 1<<log 2TrafoSize.

Then a length and a width of the transform block are determined according to the determined parameter log 2TrafoSize of the transform block and the splitting manner used by the image block. As shown in FIG. 1b, the 2N×N splitting manner is used for the image block. In this case, the transform blocks use 2M×0.5M transform (h=2, v=0.5) shown in FIG. 6a. That is, horizontal sizes of the transform blocks are consistent with a horizontal size of the image block, and vertical sizes of the transform blocks are one fourth of a vertical size of the image block. The parameter log 2TrafoSize is used for indication. In this case, a transform block size corresponding to the 2N×N splitting manner is (1<<(log 2TrafoSize+1))×(1<<(log 2TrafoSize−1)). Similarly, when the N×2N splitting manner shown in FIG. 1c is used for the image block, the transform blocks use 0.5M× 2M transform (h=0.5, v=0.5) shown in FIG. 6b. That is, horizontal sizes of the transform blocks are one fourth of the horizontal size of the image block, and vertical sizes of the transform blocks are consistent with the vertical size of the image block. The parameter log 2TrafoSize is used for indication. In this case, a transform block size corresponding to the N×2N splitting manner is (1<<(log 2TrafoSize−1))× (1<<(log 2TrafoSize+1)). As shown in FIG. td, the N×N splitting manner is used for the image block, and a transform block size is M×M (h=1, v=1). That is, both a horizontal size and a vertical size of a transform block are half of the size of the image block. The parameter log 2TrafoSize is used for indication. In this case, a transform block size corresponding to the N×N splitting manner is (1<<log 2TrafoSize)× (1<<log 2TrafoSize).

Specifically, when the size of the image block is 32×32, according to the preceding method, the value of log 2CUSize is 5, and the initial value of log 2TrafoSize is 5. If the value of max_transform_hierarchy_depth_inter is 1, values of log 2TrafoSize corresponding to the splitting manners 2N×N, N×2N, and N×N are 4, 4, and 4, and transform block sizes are obtained as 32×32, 8×32, and 16×16 according to the splitting manners respectively.

When the value of InterSplitFlag is 1, as shown in FIG. 2a to FIG. 2d, the image block is split by using 2N×nU, 2N×nD, nL×2N, and nR×2N, and its splitting manners are 2N×nU, 2N×nD, nL×2N, and nR×2N respectively. In this case, a value of log 2TrafoSize of a transform block corresponding to the image block decreases by 1, that is, log 2TrafoSize=log 2CUSize−1. Then a length and a width of the transform block are determined according to the determined parameter log 2TrafoSize of the transform block and the splitting manner used by the image block. A transform block size corresponding to the splitting manners 2N×nU and 2N×nD is (1<<(log 2TrafoSize+1))×(1<<(log 2TrafoSize−1)), that is, the transform block size is 2M×0.5M (h=2, v=0.5). A transform block size corresponding to the splitting manners nL×2N and nR×2N is (1<<(log 2TrafoSize−1))× (1<<(log 2TrafoSize+1)), that is, the transform block size is 0.5M×2M (h=0.5, v=2).

Specifically, when the size of the image block is 32×32, according to the preceding method, the value of log 2CUSize is 5, and the initial value of log 2TrafoSize is 5. If the value of max_transform_hierarchy_depth_ inter is 1, values of log 2TrafoSize corresponding to the splitting manners 2N×nU, 2N×nD, nL×2N, and nR×2N are 4, 4, 4, and 4, and transform block sizes are obtained as 32×8, 32×8, 8×32, and 8×32 according to the splitting manners respectively.

According to the embodiment of the present invention, during determination of a transform block size, the transform block size is obtained according to a splitting manner of an image block and a parameter of a transform block corresponding to the image block. Therefore, a transform block matching the splitting manner of the image block can be used, improving image compression efficiency.

The following describes another embodiment of the present invention. In this embodiment, non-square transform (non-square transform) is not used. Similar to the previous embodiment, a size of an image block is determined as 2M×2M, 2M is indicated by using a parameter log 2CUSize, and a relationship between the two is 2M=1<<log 2CUSize. It is assumed that a parameter used to identify basic information of a transform block size is log 2TrafoSize, and an initial value of log 2TrafoSize is log 2CUSize. In this embodiment, before 501 of FIG. 5, a splitting flag value (InterSplitFlag for short) is obtained according to a splitting manner and a hierarchy flag value (max_transform_hierarchy_depth_inter for short). The hierarchy flag value is used to indicate whether a layer-by-layer identification manner is used for a transform block. And it is determined, based on the splitting flag value, whether to determine the transform block size according to a splitting manner of the image block.

It is assumed that a splitting layer number of a transform block is trafoDepth and a size of the transform block is indicated by using log 2TrafoSize, that is, the size of the transform block is (1<<log 2TrafoSize), where log 2TrafoSize is an indication value of the transform block size. An initial value of trafoDepth is 0.

When a coding end identifies a value of max_transform_hierarchy_depth_inter in a code stream as 1, it indicates that transform blocks of multiple sizes are used for an image block at the coding end to transform image block data and the preceding layer-by-layer identification method is used for identify a number of a layer where a transform block is located or a size of a transform block; or when the coding end identifies the value of max_transform_hierarchy_depth_inter in the code stream as 0, it indicates that a transform block of one size is used for the image block at the coding end to transform image block data; and when a decoding end parses the code stream and obtains a value of max_transform_hierarchy_depth_inter which is 1, it indicates that the layer-by-layer identification method is used for an image block at the decoding end to obtain the number of the layer where the transform block is located or the size of the transform block; or when the decoding end parses the code stream and obtains a value of max_transform_hierarchy_depth_inter which is 0, it indicates that a transform block of one size is used for the image block at the decoding end to transform image block data.

It is assumed that the size of the image block is 2M×2M. When the value of max_transform_hierarchy_depth_inter is 0, a transform block of one size is used for the image block to transform image block data. In this case, if the size of the transform block is still square (square, that is, a width and a height of the transform block are equal to each other) and when a splitting manner of the image block is 2N×N or N×2N, the size of the transform block is M×M, which can ensure that the transform block does not cross a boundary of a prediction block, and then a value of trafoDepth changes from 0 to 1; or when the splitting manner of the image block is 2N×nU, 2N×nD, nL×2N, or nL×2N, the size of the transform block is 0.5M×0.5M, which can ensure that the transform block does not cross the boundary of the prediction block, and then the value of trafoDepth changes from 0 to 2.

Specifically, in coding and decoding operations, the size of the transform block may be determined according to the following steps:

(1) Obtain a splitting parameter interSplitFlag according to the splitting manner of the image block and a layer number of the transform block. When the splitting manner of the image block is 2N×N or N×2N, if the layer number of the transform block is 0, it indicates that the size of the transform block is consistent with that of the image block. According to the preceding principle, the transform block still crosses a boundary of a prediction block. Therefore, the transform block needs to be split into smaller transform blocks. In this case, interSplitFlag is set to 1, indicating that the transform block needs to be split. When the splitting manner of the image block is 2N×nU, 2N×nD, nL×2N, or nL×2N, if the layer number of the transform block is 0, it indicates that the size of the transform block is consistent with the image block. According to the preceding principle, the transform block needs to be split into smaller transform blocks. If the layer number of the transform block is 1, it indicates that both the width and the depth of the transform block are half that of the image block. According to the preceding principle, the transform block still crosses a boundary of a prediction block. Therefore, when the layer number of the transform block is 0 or 1, the transform block needs to be split. In this case, the value of interSplitFlag is 1, indicating that the transform block needs to be split. It is assumed that the splitting manner of the image block is represented by using PartMode, and the splitting manners 2N×N, N×2N, 2N×nU, 2N×nD, nL×2N, and nL×2N are respectively represented by using 2N×N, N×2N, 2N×nU, 2N×nD, nL×2N, and nL×2N. In the embodiment of the present invention, a derivation process of interSplitFlag may be expressed by using the following expression:

interSplitFlag=(max_transform_hierarchy_depth_inter==0 &&
PredMode==MODE_INTER &&
((PartMode==PART_2N×
N||PartMode==PART_N×2N) && trafoDepth==0)||((PartMode==PART_2N×
nU||PartMode==PART_2N×
nD||PartMode==PART_nL×
2N||PartMode==PART_nR×2N) &&
trafoDepth<=1))

In another optional embodiment, a derivation process of interSplitFlag may also be expressed by using the following expression:

interSplitFlag=(max_transform_hierarchy_depth_inter==0 &&
PredMode==MODE_INTER && (PartMode !=PART_2N×2N && trafoDepth==0)||
(!non_square_quadtree_enabled_flag &&
((PartMode==PART_2N×
nU||PartMode==PART_2N×
nD||PartMode==PART_nL×
2N||PartMode==PART_nR×2N) &&
trafoDepth<=1)))

where !non_square_quadtree_enabled_flag indicates that non-square transform (non-square transform) is not used.

(2) Obtain a further-splitting parameter interFurtherSplitFlag according to the splitting parameter interSplitFlag and the splitting manner of the image block, to determine whether to further split the transform block, that is, whether to split the transform block into a size of 0.5M×0.5M. When the value of interSplitFlag is 1 and the splitting manner of the image block is 2N×nU, 2N×nD, nL×2N, or nL×2N, a value of interFurtherSplitFlag is 1. A derivation process of interFurtherSplitFlag may be expressed by using the following expression:

interFurtherSplitFlag=interSplitFlag &&
(PartMode==PART_2N×
nU||PartMode==PART_2N×
nD||PartMode==PART_nL×
2N||PartMode==PART_nR×2N)

(3) Determine, according to interSplitFlag or the parameters interSplitFlag and interFurtherSplitFlag, a maximum number of transform block layers corresponding to the transform block. When interSplitFlag is 1, the size of the transform block changes from 2M×2M to a smaller size, and in this case the maximum number of transform block layers is 1; and when the value of interFurtherSplitFlag is 1, the transform block needs to be further split into transform blocks of a smaller size, and in this case the maximum number of transform block layers is 2. The maximum number of transform block layers may be derived from the following expression:

$$\text{maxDepth} = \text{max\_transform\_hierarchy\_depth\_inter} + \text{interSplitFlag} + \text{interFurtherSplitFlag}$$

(4) When the value of interSplitFlag is 1 indicating that the transform block needs to be split, set a value of a splitting flag of the transform block to 1, to indicate that the transform block needs to be split. The splitting flag of the transform block is indicated by using split_transform_flag.

(5) Increase the layer number of the transform block by 1, that is, trafoDepth=trafoDepth+1, when a value of split_transform_flag is 1; and decrease the value of log 2TrafoSize by 1, that is, log 2TrafoSize=log 2TrafoSize−1, when the value of split_transform_flag is 1.

(6) When the value of trafoDepth is greater than or equal to maxDepth, the coding end does not code split_transform_flag.

(7) When the value of trafoDepth is greater than or equal to maxDepth, the decoding end does not decode split_transform_flag.

The following describes another embodiment of the present invention. In this embodiment, first a size of an image block is determined as 2M×2M, 2M is indicated by using a parameter log 2CUSize, and a relationship between the two is 2M=1<<log 2CUSize. It is assumed that a parameter used to identify basic information of a transform block size is log 2TrafoSize, and an initial value of log 2TrafoSize is log 2CUSize. A numerical value of log 2TrafoSize of a transform block corresponding to the image block is determined according to a splitting manner of the image block. As shown in FIG. 6a and FIG. 6b, the image block is split by using 2N×nU and 2N×nD, and splitting manners are 2N×nU and 2N×nD. In this case, n=0.25. That is, the image block is split in the image block splitting manner 2N×nU into two parts 2M×0.25M and 2M×1.75M; and the image block is split in the image block splitting manner 2N×nD into two parts 2M×1.75M and 2M×0.25M. In this case, the transform block size needs to become smaller to adapt to a size of the prediction block in order to ensure that the transform block does not cross a boundary of a prediction block. The value of log 2TrafoSize decreases by 2, that is, log 2TrafoSize=log 2CUSize−2. As shown in FIG. 6c and FIG. 6d, the image block is split by using nL×2N and nR×2N, and splitting manners are nL×2N and nR×2N. In this case, n=0.25. That is, the image block is split in the image block splitting manner nL×2N into two parts 0.25M×2M and 2M×1.75M; and the image block is split in the image block splitting manner nR×2N into two parts 1.75M×2M and 0.25M×2M. In this case, the transform block size needs to become smaller to adapt to a size of the prediction block in order to ensure that the transform block does not cross a boundary of a prediction block. The value of log 2TrafoSize decreases by 2, that is, log 2TrafoSize=log 2CUSize−2.

Here, the preceding log 2TrafoSize=log 2CUSize−2 may be based on a formula log 2TrafoSize=log 2CUSize−m1 (m1=2), or based on a formula log 2TrafoSize=log 2CUSize−trafoDepth−m2. Similar to the description in the first embodiment, a layer number corresponding to transform blocks of splitting manners 2N×N, N×2N, and N×N is trafoDepth=1. In addition, m2=1. Here, although m1=2 or m2=1 is used as an example, the embodiment of the present invention is not limited to these specific numerical values. For example, m1 or m2 may take a larger value.

In this case, a first size is 1<<log 2TrafoSize.

Figure 7A:
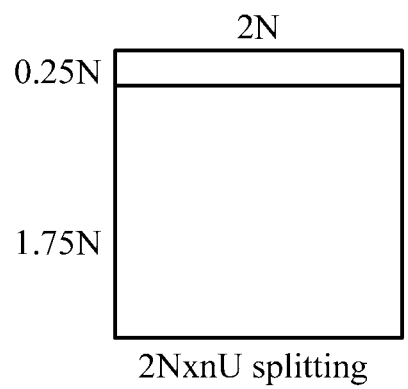
FIG. 7a, FIG. 7b, FIG. 7c and FIG. 7d are schematic diagrams of transform blocks according to an embodiment of the present invention.
Figure 7B:
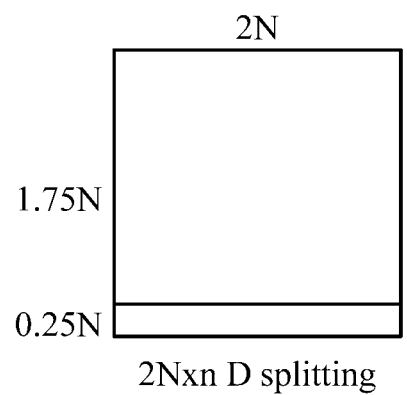
Figure 7C:
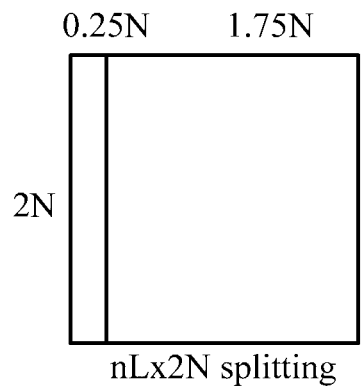
Figure 7D:
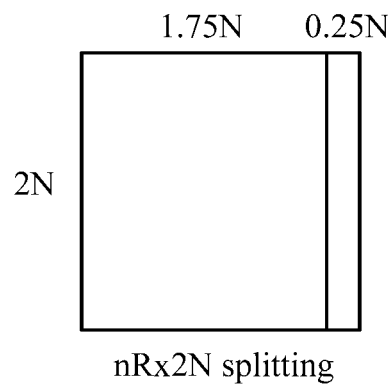

Then a length and a width of the transform block are determined according to the determined parameter log 2TrafoSize of the transform block and a splitting manner used by the image block. As shown in FIG. 7a and FIG. 7b, a transform block size corresponding to the splitting manners 2N×nU and 2N×nD is (1<<(log 2TrafoSize+2))×(1<<(log 2TrafoSize−1)). That is, the transform block size is 2M×0.5M (h=2, v=0.25). As shown in FIG. 7c and FIG. 7d, a transform block size corresponding to the splitting manners nL×2N and nR×2N is (1<<(log 2TrafoSize−1))×(1<<(log 2TrafoSize+2)). That is, the transform block size is 0.25M×2M (h=0.25, v=2).

Specifically, when the size of the image block is 32×32, according to the preceding method, the value of log 2CUSize is 5, and the initial value of log 2TrafoSize is 5; values 3, 3, 3, and 3 of log 2TrafoSize corresponding to the splitting manners 2N×nU, 2N×nD, nL×2N, and nR×2N are obtained at first; and transform block sizes are obtained as 32×4, 32×4, 4×32, and 4×32 according to the splitting manners respectively.

According to the embodiment of the present invention, during determination of a transform block size, the transform block size is obtained according to a splitting manner of an image block and a parameter of a transform block corresponding to the image block. Therefore, a transform block matching the splitting manner of the image block can be used, improving image compression efficiency.

The following describes another embodiment of the present invention. In this embodiment, first a size of an image block is determined as 2M×2M, 2M is indicated by using a parameter log 2CUSize, and a relationship between the two is 2M=1<<log 2CUSize. It is assumed that a parameter used to identify basic information of a transform block size is log 2TrafoSize, and an initial value of log 2TrafoSize is log 2CUSize. A numerical value of log 2TrafoSize of a transform block corresponding to the image block is determined according to a splitting manner of the image block. As shown in FIG. 7a and FIG. 7b, the image block is split by using 2N×nU and 2N×nD, and splitting manners are 2N×nU and 2N×nD. In this case, n=0.25. That is, the image block is split in the image block splitting manner 2N×nU into two parts 2M×0.25M and 2M×1.75M; and the image block is split in the image block splitting manner 2N×nD into two parts 2M×1.75M and 2M×0.25M. In this case, the value of log 2TrafoSize decreases by 1, that is, log 2TrafoSize=log 2CUSize−1.

As shown in FIG. 7c and FIG. 7d, the image block is split by using nL×2N and nR×2N, and splitting manners are nL×2N and nR×2N. In this case, n=0.25. That is, the image block is split in the image block splitting manner nL×2N into two parts 0.25M×2M and 2M×1.75M; and the image block is split in the image block splitting manner nR×2N into two parts 1.75M×2M and 0.25M×2M. In this case, the value of log 2TrafoSize decreases by 1, that is, log 2TrafoSize=log 2CUSize−1.

In this case, a first size is 1<<log 2TrafoSize.

Then a length and a width of the transform block are determined according to the determined parameter log 2TrafoSize of the transform block and the splitting manner used by the image block. As shown in FIG. 7a and FIG. 7b, because the splitting manners 2N×nU and 2N×nD use a smaller prediction block, a transform block size needs to become smaller to adapt to a size of the prediction block in order to ensure that the transform block does not cross a boundary of the prediction block. Therefore, a transform block size of the two splitting manners is (1<<(log 2TrafoSize+1))×(1<<(log 2TrafoSize−2)). That is, the transform block size is 2M×0.5M (h=2, v=0.25).

Similarly, as shown in FIG. 7c and FIG. 7d, because the splitting manners nL×2N and nR×2N use a smaller prediction block, a size of the transform block needs to become smaller to adapt to a size of the prediction block. Therefore, a transform block size of the two splitting manners is (1<<(log 2TrafoSize−2))×(1<<(log 2TrafoSize+1). That is, the transform block size is 0.25M×2M (h=0.25, v=2).

Specifically, when the size of the image block is 32×32, according to the preceding method, the value of log 2CUSize is 5, and the initial value of log 2TrafoSize is 5; values 3, 3, 3, and 3 of log 2TrafoSize corresponding to the splitting manners 2N×nU, 2N×nD, nL×2N, and nR×2N are obtained at first; and transform block sizes are obtained as 32×4, 32×4, 4×32, and 4×32 according to the splitting manners respectively.

According to the embodiment of the present invention, during determination of a transform block size, the transform block size is obtained according to a splitting manner of an image block and a parameter of a transform block corresponding to the image block. Therefore, a transform block matching the splitting manner of the image block can be used, improving image compression efficiency.

Figure 8:
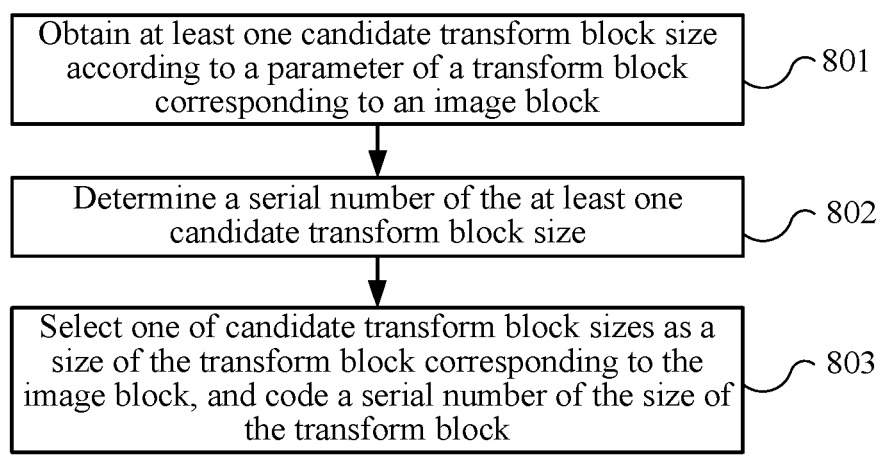
FIG. 8 is a flowchart of an image coding method according to an embodiment of the present invention.

FIG. 8 is a flowchart of an image coding method according to an embodiment of the present invention.

801. Obtain at least one candidate transform block size according to a parameter of a transform block corresponding to an image block.

Optionally, in an embodiment, the parameter of the transform block may include a layer number corresponding to the transform block or an indication value of a transform block size. In this case, in a manner similar to the preceding embodiment, a candidate transform block size may be obtained according to the parameter, or a candidate transform block size may be obtained according to the parameter and image block information. Similar to the preceding embodiment, the image block information may include a size of the image block, an indication value of the size of the image block, a layer number of the image block, or a serial number of the size of the image block.

A difference from the preceding embodiment is that, in this embodiment, one or more candidate transform block sizes may be acquired for each splitting manner. For example, each of splitting manners 2N×N, N×2N, and N×N may correspond to three candidate transform block sizes M×M, 2M×0.5M, and 0.5M×2M.

802. Determine a serial number of the at least one candidate transform block size.

A candidate transform block size may be directly numbered. For example, candidate transform block sizes are sequentially numbered as 0, 1, 2, . . . , starting from a certain transform block size (called a first transform block size).

Optionally, in another embodiment, a candidate transform block size may be numbered according to a splitting manner of the image block. In other words, a serial number of a candidate transform block size may be different for different splitting manners. In this case, the first transform block size among the candidate transform block sizes may correspond to a splitting manner, for example, it is a most possible transform block size or an optimal transform block size under the splitting manner. For example, for a 2N×N splitting manner, if it is considered according to the preceding embodiment that a transform block size 2M×0.5M can reflect a stripe characteristic of an image and is an optimal transform block size, the transform block size 2M×0.5M may be used as the first transform block size, and according to this, the candidate transform block sizes are numbered.

In an embodiment, the first transform block size may correspond to a preset serial number, for example, correspond to a smallest serial number (such as a serial number "0") or another serial number.

803. Select one of the candidate transform block sizes as a size of the transform block corresponding to the image block, and code a serial number of the size of the transform block.

Optionally, during the coding of the serial number of the size of the transform block, the serial number of the size of the transform block is coded into a code stream of the image block, so that a decoding end is capable of obtaining the serial number by parsing the code stream, to obtain the corresponding size of the transform block. In addition, a serial number value written into the code stream may also be determined according to the selected candidate transform block size and the preset serial number corresponding to the first transform block size.

Therefore, according to the embodiment of the present invention, during image coding, a transform block size to be used is selected from a candidate transform block size, and a corresponding serial number of the selected transform block size is coded, so that an appropriate transform block can be selected, thereby improving image compression efficiency.

Figure 9:
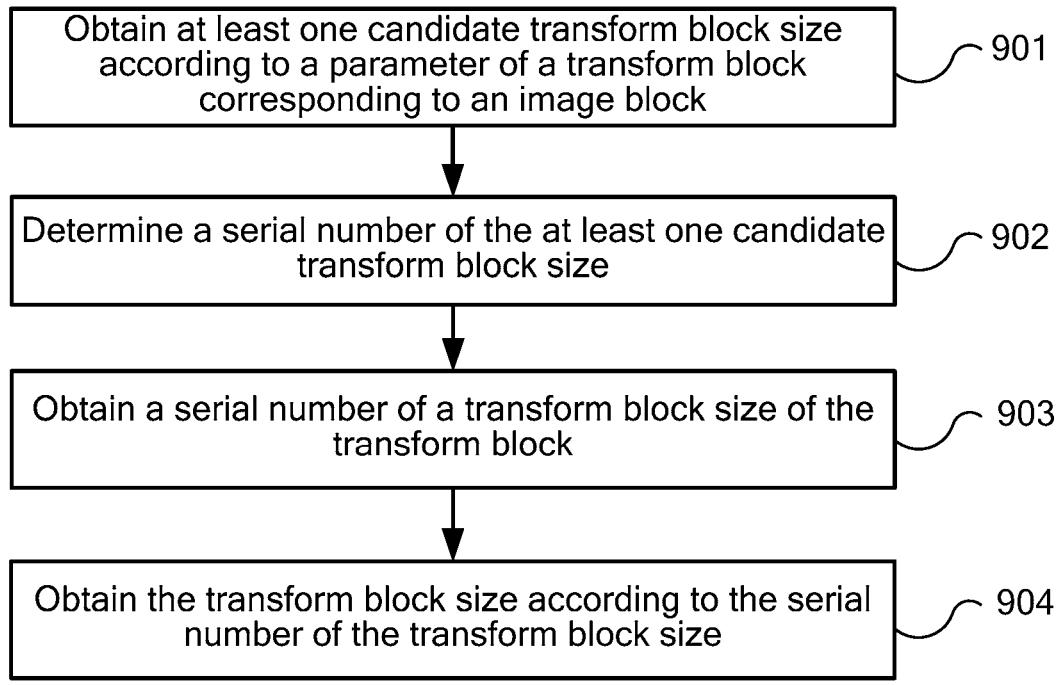
FIG. 9 is a flowchart of an image decoding method according to an embodiment of the present invention.

FIG. 9 is a flowchart of an image decoding method according to an embodiment of the present invention.

901. Obtain at least one candidate transform block size according to a parameter of a transform block corresponding to an image block.

901 may be similar to 801 in FIG. 8 and therefore no further description is provided herein.

902. Determine a serial number of the at least one candidate transform block size.

902 may be similar to 802 in FIG. 8 and therefore no further description is provided herein.

903. Obtain a serial number of a transform block size of the transform block.

An operation of a decoding end may correspond to that of a coding end. For example, if the coding end codes the serial number of the size of the transform block into a code stream of the image block, the decoding end may parse the code stream to obtain the serial number of the transform block size of the transform block.

904. Obtain the transform block size according to the serial number of the transform block size.

In 902, correspondence between the serial number of the candidate transform block size and the transform block size has already been obtained. Therefore, in 904, the transform block size may be obtained according to the serial number of the transform block size. For example, the transform block size of the transform block may be obtained according to the serial number of the transform block size of the transform block obtained by parsing the code stream and a preset serial number corresponding to the first transform block size.

Therefore, according to the embodiment of the present invention, during image decoding, correspondence between a candidate transform block size and a serial number of the candidate transform block size is obtained, so that when a serial number of a used transform block size is obtained, the transform block size may be obtained, and then an appropriate transform block selected by a coding end can be obtained, thereby improving image compression efficiency.

The following describes the embodiment of the present invention with more details by combining specific examples.

In an embodiment, first, a size of an image block is determined as 2M×2M, 2M is indicated by using a parameter log 2CUSize, and a relationship between the two is 2M=1<<log 2CUSize. It is assumed that a parameter used to identify basic information of a transform block size is log 2TrafoSize, and an initial value of log 2TrafoSize is log 2CUSize. A numerical value of log 2TrafoSize of a transform block corresponding to the image block is determined according to a splitting manner of the image block. For example, a method for determining the numerical value of log 2TrafoSize of the transform block corresponding to the image block may be consistent with the method of the preceding embodiment.

In this embodiment, there are three candidate transform block sizes M×M, 2M×0.5M, and 0.5M×2M for all of splitting manners 2N×N, N×2N, and N×N. The coding end traverses each candidate transform block size to determine an optimal transform block size. As shown in FIG. 1b, FIG. 1c, and FIG. 1d, the splitting manners 2N×N, N×2N, and N×N are used for the image block. The three candidate transform block sizes are (1<<log 2TrafoSize)×(1<<log 2TrafoSize), (1<<(log 2TrafoSize+1))×(1<<(log 2TrafoSize−1)), and (1<<(log 2TrafoSize−1))×(1<<(log 2TrafoSize+1)).

The three candidate transform block sizes are numbered. A transform block size corresponding to a reference serial number is determined according to a splitting manner. For example, for the splitting manner 2N×N, a transform block size corresponding to a reference serial number 0 of the splitting manner 2N×N is 2M×0.5M. Then serial numbers of the rest two transform block sizes are determined. For example, for the splitting manner 2N×N, serial numbers corresponding to an M×M transform block size and a 0.5M×2M transform block size are 1 and 2 respectively. A serial number corresponding to the preceding optimal transform block size is written into a code stream.

A purpose of the preceding coding process is located in that an optimal transform block size is determined by using a traversal selection manner at the coding end to attain optimal coding efficiency. In addition, to identify the selected optimal transform block size, a transform block size needs to be numbered and a serial number is written into a code stream. Generally the serial number is written in a variable-length manner into the code stream. For example, a code '0' is written into the code stream by using a 1-bit symbol string, and serial numbers '1' and '2' are written into the code stream respectively by using 2-bit symbol strings '00' and '01'. Therefore, allocating a smallest bit symbol string (such as the symbol string corresponding to the preceding serial number 0) to a most possible transform block size may achieve purposes of saving code bits and improving coding efficiency. According to the preceding analysis, correlation exists between a splitting manner and a transform block size. For example, the splitting manner 2N×N tends more to use the 2M×0.5M transform block size. Therefore, a transform block type may be numbered according to a splitting manner.

When the 2N×N splitting manner is used for the image block, the image block tends to use 2M×0.5M transform and therefore it is assumed that a serial number corresponding to 2M×0.5M is 0, and serial numbers corresponding to M×M and 0.5M×2M transform are 1 and 2 respectively; when the N×2N splitting manner is used for the image block, the image block tends to use 0.5M×2M transform and therefore it is assumed that a serial number corresponding to 0.5M×2M is numbered 0, and serial numbers corresponding to 2M×0.5M and M×M transform are 1 and 2 respectively; and when the N×N splitting manner is used for the image block, the image block tends to use M×M transform and therefore it is assumed that a serial number corresponding to M×M is numbered 0, and serial numbers corresponding to 2M×0.5M and 0.5M×2M transform are 1 and 2 respectively.

A process of the decoding end is a reverse process of the coding end. First, a numerical value of log 2TrafoSize of a transform block corresponding to the image block is determined according to the splitting manner of the image block. A method for determining the numerical value of log 2TrafoSize of a transform block corresponding to the image block may be consistent with the preceding method. A candidate transform block size is obtained according to the numerical value of log 2TrafoSize. Then a code stream is decoded to obtain a serial number of a transform block size, and the transform block size corresponding to the serial number is obtained according to the splitting manner. A size of the transform block corresponding to the image block is obtained according to the serial number.

Therefore, during image coding and decoding according to the embodiment of the present invention, during image coding and decoding, a transform block size to be used is selected from a candidate transform block size and a corresponding serial number of the selected transform block size is coded, so that an appropriate transform block can be selected, thereby improving image compression efficiency.

In another embodiment, first, a size of an image block is determined as 2M×2M, 2M is indicated by using a parameter log 2CUSize, and a relationship between the two is 2M=1<<log 2CUSize. It is assumed that a parameter used to identify basic information of a transform block size is log 2TrafoSize, and an initial value of log 2TrafoSize is log 2CUSize. A numerical value of log 2TrafoSize of a transform block corresponding to the image block is determined according to a splitting manner of the image block.

When the value of log 2TrafoSize is determined for the image block by using the preceding layer-by-layer identification method, when the transform block is located in a 0th layer, the value of log 2TrafoSize does not change, that is, log 2TrafoSize=log 2CUSize; when the transform block is located in a $1^{st}$ layer, the value of log 2TrafoSize decreases by 1 as compared with the value of log 2TrafoSize in the 0th layer, that is, log 2TrafoSize=log 2CUSize−1; when the transform block is located in a $2^{nd}$ layer, the value of log 2TrafoSize decreases by 1 as compared with the value of log 2TrafoSize in the $1^{st}$ layer, that is, log 2TrafoSize=log 2CUSize−2; and so on till a value of log 2TrafoSize is obtained.

A basic size parameter TL corresponding to a transform block in each layer is obtained according to the value of log 2TrafoSize, and a value of TL is equal to (1<<log 2TrafoSize). In the each layer, there are three candidate transform block sizes TL×TL, 2TL×0.5TL, and 0.5TL×2TL for all of splitting manners 2N×N, N×2N, and N×N. The coding end traverses each candidate transform block size to determine an optimal transform block size. As shown in FIG. 1b, FIG. 1c, and FIG. 1d, the splitting manners 2N×N, N×2N, and N×N respectively are used for the image block. The three candidate transform block sizes are (1<<log 2TrafoSize)×

(1<<log 2TrafoSize), (1<<(log 2TrafoSize+1))×(1<<(log 2TrafoSize−1)), and (1<<(log 2TrafoSize−1))×(1<<(log 2TrafoSize+1)).

The three candidate transform block sizes are numbered. A transform block size corresponding to a reference serial number is determined according to a splitting manner. For example, for the splitting manner 2N×N, a transform block size corresponding to a reference serial number 0 of the splitting manner 2N×N is 2TL×0.5TL. Then serial numbers of the rest two transform block sizes are determined. For example, for the splitting manner 2N×N, serial numbers corresponding to a TL×TL transform block size and a 0.5TL×2TL transform block size are 1 and 2 respectively. A serial number corresponding to the preceding optimal transform block size is written into a code stream.

When the 2N×N splitting manner is used for the image block, the image block tends to use 2TL×0.5TL transform and therefore it is assumed that a serial number corresponding to 2TL×0.5TL is 0, and serial numbers corresponding to TL×TL and 0.5TL×2TL transform are 1 and 2 respectively; when the N×2N splitting manner is used for the image block, the image block tends to use 0.5TL×2TL transform and therefore it is assumed that a serial number corresponding to 0.5TL×2TL is numbered 0, and serial numbers corresponding to 2TL×0.5TL and TL×TL transform are 1 and 2 respectively; and when the N×N splitting manner is used for the image block, the image block tends to use TL×TL transform and therefore it is assumed that a serial number corresponding to TL×TL is numbered 0, and serial numbers corresponding to 2TL×0.5TL and 0.5TL×2TL transform are 1 and 2 respectively.

A process of the decoding end is a reverse process of the coding end. First, a numerical value of log 2TrafoSize of a transform block corresponding to the image block is determined according to the splitting manner of the image block. A method for determining the numerical value of log 2TrafoSize of a transform block corresponding to the image block may be consistent with the preceding method. A candidate transform block size is obtained according to the numerical value of log 2TrafoSize. Then a code stream is decoded to obtain a serial number of a transform block size, and the transform block size corresponding to the serial number is obtained according to the splitting manner. A size of the transform block corresponding to the image block is obtained according to the serial number.

Therefore, according to the embodiment of the present invention, during image coding and decoding, a transform block size to be used is selected from a candidate transform block size and a corresponding serial number of the selected transform block size is coded, so that an appropriate transform block can be selected, thereby improving image compression efficiency.

In another embodiment, first, a size of an image block is determined as 2M×2M, 2M is indicated by using a parameter log 2CUSize, and a relationship between the two is 2M=1<<log 2CUSize. It is assumed that a parameter used to identify basic information of a transform block size is log 2TrafoSize, and an initial value of log 2TrafoSize is log 2CUSize. A numerical value of log 2TrafoSize of a transform block corresponding to the image block is determined according to a splitting manner of the image block.

When the value of log 2TrafoSize is determined for the image block by using the preceding layer-by-layer identification method, when the transform block is located in a 0th layer, the value of log 2TrafoSize does not change, that is, log 2TrafoSize=log 2CUSize; when the transform block is located in a $1^{st}$ layer, the value of log 2TrafoSize decreases by 1 as compared with the value of log 2TrafoSize in the 0th layer, that is, log 2TrafoSize=log 2CUSize−1; when the transform block is located in a $2^{nd}$ layer, the value of log 2TrafoSize decreases by 1 as compared with the value of log 2TrafoSize in the $1^{st}$ layer, that is, log 2TrafoSize=log 2CUSize−2; and so on till a value of log 2TrafoSize is obtained.

A basic size parameter TL corresponding to a transform block in each layer is obtained according to the value of log 2TrafoSize, and a value of TL is equal to (1<<log 2TrafoSize). In the each layer, there are three candidate transform block sizes TL×TL, 2TL×0.5TL, and 0.5TL×2TL for all of splitting manners 2N×N, N×2N, and N×N. The coding end traverses each candidate transform block size to determine an optimal transform block size. As shown in FIG. 1b, FIG. 1c, and FIG. 1d, the splitting manners 2N×N, N×2N, and N×N are used for the image block. The three candidate transform block sizes are (1<log 2TrafoSize)×(1<<log 2TrafoSize), (1<<(log 2TrafoSize+1))×(1<<(log 2TrafoSize−1)), and (1<<(log 2TrafoSize−1))×(1<<(log 2TrafoSize+1)).

The three candidate transform block sizes are numbered. For example, (1<<log 2TrafoSize)×(1<<log 2TrafoSize), (1<<(log 2TrafoSize+1))×(1<<(log 2TrafoSize−1)), and (1<<(log 2TrafoSize−1))×(1<<(log 2TrafoSize+1)) correspond to serial numbers 0, 1, and 2 respectively. A serial number corresponding to the preceding optimal transform block size is written into a code stream.

A process of the decoding end is a reverse process of the coding end. First, a numerical value of log 2TrafoSize of a transform block corresponding to the image block is determined according to the splitting manner of the image block. A method for determining the numerical value of log 2TrafoSize of a transform block corresponding to the image block may be consistent with the preceding method. A candidate transform block size is obtained according to the numerical value of log 2TrafoSize. Then a code stream is decoded to obtain a serial number of a transform block size, and a size of the transform block corresponding to the image block is obtained according to the serial number.

Therefore, according to the embodiment of the present invention, during image coding and decoding, a transform block size to be used is selected from a candidate transform block size and a corresponding serial number of the selected transform block size is coded, so that an appropriate transform block can be selected, thereby improving image compression efficiency.

Figure 10:
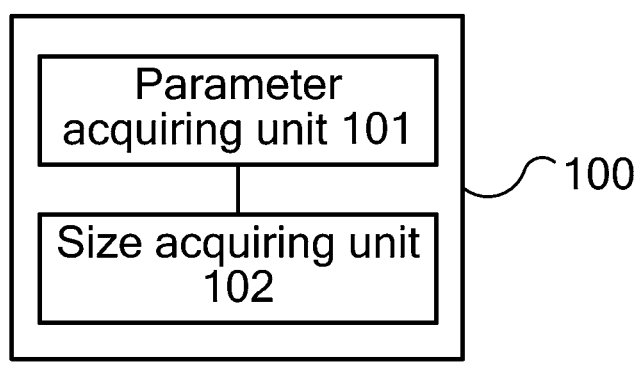
FIG. 10 is a block diagram of a device for determining a transform block size according to an embodiment of the present invention.

FIG. 10 is a block diagram of a device for determining a transform block size according to an embodiment of the present invention. A device 100 shown in FIG. 10 includes a parameter acquiring unit 101 and a size acquiring unit 102.

The parameter acquiring unit 101 obtains, according to image block information and a splitting manner of an image block, a parameter of a transform block corresponding to the image block; and the size acquiring unit 102 obtains a transform block size according to the parameter of the transform block and the splitting manner of the image block.

According to the embodiment of the present invention, during determination of a transform block size, the transform block size is obtained according to a splitting manner of an image block and a parameter of a transform block corresponding to the image block. Therefore, a transform block matching the splitting manner of the image block can be used, improving image compression efficiency.

The device 100 provided in the embodiment of the present invention is capable of executing each process of the preceding methods. To avoid repetition, no further details are provided herein. For example, the parameter of the transform block by the parameter acquiring unit 101 may include a layer number corresponding to the transform block or an indication value of a size of the transform block.

In addition, a horizontal size of the transform block obtained by the size acquiring unit 102 is greater than a vertical size of the transform block when a horizontal size of a prediction block is greater than a vertical size of the prediction block; or an obtained vertical size of the transform block is greater than a horizontal size of the transform block when a vertical size of a prediction block is greater than a horizontal size of the prediction block; or an obtained horizontal size of the transform block is equal to a vertical size of the transform block when a horizontal size of a prediction block is equal to a vertical size of the prediction block.

Figure 11:
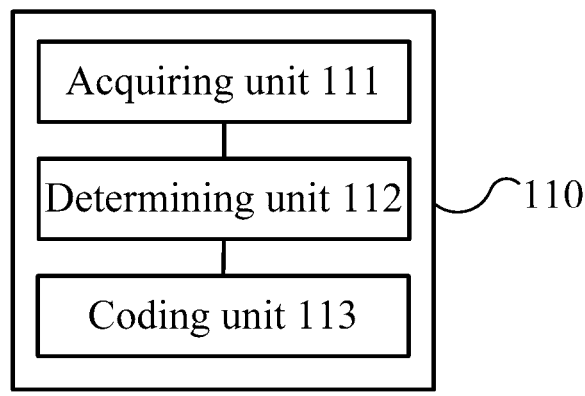
FIG. 11 is a block diagram of an image coding device according to an embodiment of the present invention.

FIG. 11 is a block diagram of an image coding device according to an embodiment of the present invention. An image coding device 110 shown in FIG. 11 includes an acquiring unit 111, a determining unit 112, and a coding unit 113.

The acquiring unit 111 obtains at least one candidate transform block size according to a parameter of a transform block corresponding to an image block; the determining unit 112 determines a serial number of the at least one candidate transform block size; and the coding unit 113 selects one of candidate transform block sizes as a size of the transform block corresponding to the image block, and codes a serial number of the size of the transform block.

Therefore, according to the embodiment of the present invention, during image coding, a transform block size to be used is selected from a candidate transform block size and a corresponding serial number of the selected transform block size is coded, so that an appropriate transform block can be selected, thereby improving image compression efficiency.

The device 110 provided in the embodiment of the present invention is capable of executing each process of the preceding methods. To avoid repetition, no further details are provided herein. For example, the determining unit 112 may number a candidate transform block size according to a splitting manner of a prediction block.

In addition, the coding unit 113 may code a serial number corresponding to the selected candidate transform block size into a code stream of the image block.

Figure 12:
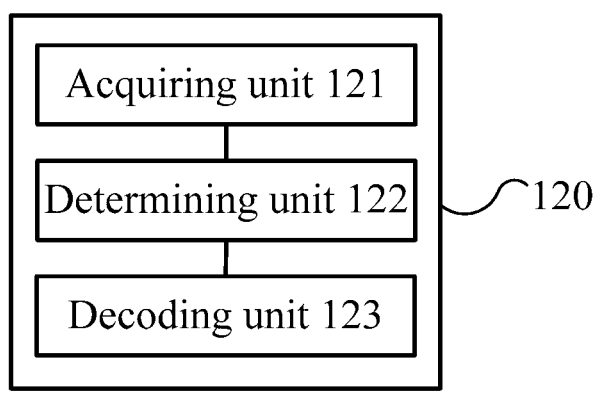
FIG. 12 is a block diagram of an image decoding device according to an embodiment of the present invention.

FIG. 12 is a block diagram of an image decoding device according to an embodiment of the present invention. An image decoding device 120 shown in FIG. 12 may include an acquiring unit 121, a determining unit 122, and a decoding unit 123.

The acquiring unit 121 obtains at least one candidate transform block size according to a parameter of a transform block corresponding to an image block; the determining unit 122 determines a serial number of the at least one candidate transform block size; and the decoding unit 123 obtains a serial number of a transform block size of the transform block and obtains the transform block size according to the serial number of the transform block size.

Therefore, according to the embodiment of the present invention, during image decoding, correspondence between a candidate transform block size and a serial number of the candidate transform block size is obtained, so that when a serial number of a used transform block size is obtained, the transform block size may be obtained, and then an appropriate transform block selected by a coding end can be obtained, thereby improving image compression efficiency.

The device 120 provided in the embodiment of the present invention is capable of executing each process of the preceding methods. To avoid repetition, no further details are provided herein. For example, the determining unit 122 may number a candidate transform block size according to a splitting manner of a prediction block.

In addition, the decoding unit 123 may parse a code stream to obtain the serial number of the transform block size of the transform block.

An operation of the image decoding device 120 shown in FIG. 12 may correspond to that of the image coding device shown in FIG. 11. For example, if the coding end codes the serial number of the size of the transform block into a code stream of the image block, the decoding end may parse the code stream to obtain the serial number of the transform block size of the transform block.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image coding method comprising:
obtaining a plurality of candidate transform block sizes according to a parameter of a transform block associated with an image block and a splitting manner of the image block;
determining a plurality of identifiers for the plurality of candidate transform block sizes, where the plurality of identifiers is more than two; and
selecting one of the plurality of candidate transform block sizes as a size of the transform block associated with the image block and coding one of the plurality of identifiers for the selected candidate transform block size into a code stream;
wherein the plurality of candidate transform block sizes includes three candidate transform block sizes of M×M, 2M×0.5M, and 0.5M×2M, wherein 2M×2M represents a size of the image block, or
TL×TL, 2TL×0.5TL, and 0.5TL×2TL, wherein TL represents a basic size parameter TL corresponding to a transform block in each layer of transfer blocks.

2. The method according to claim 1, wherein determining a plurality of identifiers for the plurality of candidate transform block sizes comprises:
numbering the plurality of candidate transform block sizes according to the splitting manner of the image block.

3. The method according to claim 1, wherein determining a plurality of identifiers for the plurality of candidate transform block sizes comprises:
determining a first transform block size among the plurality of candidate transform block sizes, and numbering the plurality of candidate transform block sizes according to the first transform block size.

4. The method according to claim 3, wherein numbering the plurality of candidate transform block sizes according to the first transform block size comprises: associating the first transform block size with a preset identifier being 0.

5. The method according to claim 1, wherein coding the identifier for the selected candidate transform block size into a code stream comprises:
determining, according to the selected candidate transform block size and a relationship between the plurality of candidate transform block sizes and the plurality of identifiers, an identifier for the selected candidate transform block size written into the code stream.

6. An image decoding method comprising:
obtaining a plurality of candidate transform block sizes according to a parameter of a transform block associated with an image block and a splitting manner of the image block;
determining a plurality of identifiers for the plurality of candidate transform block sizes, where the plurality of identifiers is more than two;
parsing a code stream to obtain an identifier of a transform block size of the transform block; and
obtaining the transform block size according to the identifier of the transform block size;
wherein the plurality of candidate transform block sizes includes three candidate transform block sizes of M×M, 2M×0.5M, and 0.5M×2M, wherein 2M×2M represents a size of the image block, or
TL×TL, 2TL×0.5TL, and 0.5TL×2TL, wherein TL represents a basic size parameter TL corresponding to a transform block in each layer of transfer blocks.

7. The method according to claim 6, wherein determining a plurality of identifiers for the plurality of candidate transform block sizes comprises:
numbering the plurality of candidate transform block sizes according to the splitting manner of the image block.

8. The method according to claim 6, wherein determining a plurality of identifiers for the plurality of candidate transform block sizes comprises:
determining a first transform block size among the plurality of candidate transform block sizes, and numbering the plurality of candidate transform block sizes according to the first transform block size.

9. The method according to claim 8, wherein numbering the plurality of candidate transform block sizes according to the first transform block size comprises: associating the first transform block size with a preset identifier being 8.

10. The method according to claim 6, wherein obtaining the transform block size according to the identifier of the transform block size comprises:
obtaining, according to the identifier of the transform block size of the transform block and a relationship between the plurality of candidate transform block sizes and the plurality of identifiers, the transform block size of the transform block.

11. An image coding device comprising:
a processor; and
a memory coupled to the processor and storing processor-executable instructions which, when executed, cause the processor to implement operations including:
obtaining a plurality of candidate transform block sizes according to a parameter of a transform block associated with an image block and a splitting manner of the image block;
determining a plurality of identifiers for the plurality of candidate transform block sizes, where the plurality of identifiers is more than two; and
selecting one of the plurality of candidate transform block sizes as a size of the transform block associated with the image block and coding an identifier for the selected candidate transform block size into a code stream;
wherein the plurality of candidate transform block sizes includes three candidate transform block sizes of
M×M, 2M×0.5M, and 0.5M×2M, wherein 2M×2M represents a size of the image block, or TL×TL, 2TL×0.5TL, and 0.5TL×2TL, wherein TL represents a basic size parameter TL corresponding to a transform block in each layer of transfer blocks.

12. The image coding device according to claim 11, wherein the operations further include:
   numbering the plurality of candidate transform block sizes according to the splitting manner of the image block.

13. An image decoding device comprising:
   a processor, and
   a memory coupled to the processor, and storing processor-executable instructions which when executed cause the processor to implement operations including:
      obtaining a plurality of candidate transform block sizes according to a parameter of a transform block associated with an image block and a splitting manner of the image block;
      determining a plurality of identifiers for the plurality of candidate transform block sizes, where the plurality of identifiers is more than two;
      parsing a code stream to obtain an identifier of a transform block size of the transform block; and
      obtaining the transform block size according to the identifier of the transform block size;
      wherein the plurality of candidate transform block sizes includes three candidate transform block sizes of
         M×M, 2M×0.5M, and 0.5M×2M, wherein 2M×2M represents a size of the image block, or
         TL×TL, 2TL×0.5TL, and 0.5TL×2TL, wherein TL represents a basic size parameter TL corresponding to a transform block in each layer of transfer blocks.

14. The image decoding device according to claim 13, wherein the operations further include:
   numbering the plurality of candidate transform block sizes according to the splitting manner of the image block.

15. The image coding method according to claim 1, wherein obtaining the plurality of candidate transform block sizes according to the parameter of the transform block associated with the image block and the splitting manner of the image block comprises:
   when the splitting manner of the image block is a splitting manner 2N×N, obtaining three candidate transform block sizes M×M, 2M×0.5M, and 0.5M×2M;
   when the splitting manner of the image block is a splitting manner N×2N, obtaining three candidate transform block sizes M×M, 2M×0.5M, and 0.5M×2M; or
   when the splitting manner of the image block is a splitting manner N×N, obtaining three candidate transform block sizes M×M, 2M×0.5M, and 0.5M×2M,
   wherein 2M×2M represents a size of the image block.

16. The image coding method according to claim 1, wherein obtaining the plurality of candidate transform block sizes according to the parameter of the transform block associated with the image block and the splitting manner of the image block comprises:
   when the splitting manner of the image block is a splitting manner 2N×N, obtaining three candidate transform block sizes TL×TL, 2TL×0.5TL, and 0.5TL×2TL;
   when the splitting manner of the image block is a splitting manner N×2N, obtaining three candidate transform block sizes TL×TL, 2TL×0.5TL, and 0.5TL×2TL; or
   when the splitting manner of the image block is a splitting manner N×N, obtaining three candidate transform block sizes TL×TL, 2TL×0.5TL, and 0.5TL×2TL,
   wherein TL represents a basic size parameter TL corresponding to a transform block in each layer of transfer blocks.

17. The image coding method according to claim 2, wherein numbering the plurality of candidate transform block sizes according to the splitting manner of the image block comprising:
   when the 2N×N splitting manner is used for the image block, determining three identifiers corresponding to three candidate transform block sizes 2M×0.5M, M×M and 0.5M×2M as 0, 1 and 2, respectively;
   when the N×2N splitting manner is used for the image block, determining three identifiers corresponding to three candidate transform block sizes 0.5M×2M, 2M×0.5M and M×M as 0, 1 and 2, respectively; or
   when the N×N splitting manner is used for the image block, determining three identifiers corresponding to three candidate transform block sizes M×M, 2M×0.5M and 0.5M×2M as 0, 1 and 2, respectively.

18. The image coding method according to claim 2, wherein numbering the plurality of candidate transform block sizes according to the splitting manner of the image block comprising:
   when the 2N×N splitting manner is used for the image block, determining three identifiers corresponding to three candidate transform block sizes 2TL×0.5TL, TL×TL and 0.5TL×2TL as 0, 1 and 2, respectively;
   when the N×2N splitting manner is used for the image block, determining three identifiers corresponding to three candidate transform block sizes 0.5TL×2TL, 2TL×0.5TL and TL×TL as 0, 1 and 2, respectively; or
   when the N×N splitting manner is used for the image block determining three identifiers corresponding to three candidate transform block sizes TL×TL, 2TL×0.5TL and 0.5TL×2TL as 0, 1 and 2, respectively.

19. The image decoding method according to claim 6, wherein obtaining the plurality of candidate transform block sizes according to the parameter of the transform block associated with the image block and the splitting manner of the image block comprises:
   when the splitting manner of the image block is a splitting manner 2N×N, obtaining three candidate transform block sizes M×M, 2M×0.5M, and 0.5M×2M;
   when the splitting manner of the image block is a splitting manner N×2N, obtaining three candidate transform block sizes M×M, 2M×0.5M, and 0.5M×2M; or
   when the splitting manner of the image block is a splitting manner N×N, obtaining three candidate transform block sizes M×M, 2M×0.5M, and 0.5M×2M,
   wherein 2M×2M represents a size of the image block.

20. The image coding method according to claim 6, wherein obtaining the plurality of candidate transform block sizes according to the parameter of the transform block associated with the image block and the splitting manner of the image block comprises:
   when the splitting manner of the image block is a splitting manner 2N×N, obtaining three candidate transform block sizes TL×TL, 2TL×0.5TL, and 0.5TL×2TL;
   when the splitting manner of the image block is a splitting manner N×2N, obtaining three candidate transform block sizes TL×TL, 2TL×0.5TL, and 0.5TL×2TL; or
   when the splitting manner of the image block is a splitting manner N×N, obtaining three candidate transform block sizes TL×TL, 2TL×0.5TL, and 0.5TL×2TL, wherein TL represents a basic size parameter TL corresponding to a transform block in each layer of transform blocks.

21. The image coding method according to claim 7, wherein numbering the plurality of candidate transform block sizes according to the splitting manner of the image block comprising:
when the 2N×N splitting manner is used for the image block, determining three identifiers corresponding to three candidate transform block sizes 2M×0.5M, M×M and 0.5M×2M as 0, 1 and 2, respectively;
when the N×2N splitting manner is used for the image block, determining three identifiers corresponding to three candidate transform block sizes 0.5M×2M, 2M×0.5M and M×M as 0, 1 and 2, respectively; or
when the N×N splitting manner is used for the image block, determining three identifiers corresponding to three candidate transform block sizes M×M, 2M×0.5M and 0.5M×2M as 0, 1 and 2, respectively.

22. The image coding method according to claim 7, wherein numbering the plurality of candidate transform block sizes according to the splitting manner of the image block comprising:
when the 2N×N splitting manner is used for the image block, determining three identifiers corresponding to three candidate transform block sizes 2TL×0.5TL, TL×TL and 0.5TL×2TL as 0, 1 and 2, respectively;
when the N×2N splitting manner is used for the image block, determining three identifiers corresponding to three candidate transform block sizes 0.5TL×2TL, 2TL×0.5TL and TL×TL as 0, 1 and 2, respectively; or
when the N×N splitting manner is used for the image block determining three identifiers corresponding to three candidate transform block sizes TL×TL, 2TL×0.5TL and 0.5TL×2TL as 0, 1 and 2, respectively.

23. The image coding device according to claim 11, wherein the operations further include:
when the splitting manner of the image block is a splitting manner 2N×N, obtaining three candidate transform block sizes M×M, 2M×0.5M, and 0.5M×2M;
when the splitting manner of the image block is a splitting manner N×2N, obtaining three candidate transform block sizes M×M, 2M×0.5M, and 0.5M×2M; or
when the splitting manner of the image block is a splitting manner N×N, obtaining three candidate transform block sizes M×M, 2M×0.5M, and 0.5M×2M,
wherein 2M×2M represents a size of the image block.

24. The image coding device according to claim 11, wherein the operations further include:
when the splitting manner of the image block is a splitting manner 2N×N, obtaining three candidate transform block sizes TL×TL, 2TL×0.5TL, and 0.5TL×2TL;
when the splitting manner of the image block is a splitting manner N×2N, obtaining three candidate transform block sizes TL×TL, 2TL×0.5TL, and 0.5TL×2TL; or
when the splitting manner of the image block is a splitting manner N×N, obtaining three candidate transform block sizes TL×TL, 2TL×0.5TL, and 0.5TL×2TL,
wherein TL represents a basic size parameter TL corresponding to a transform block in each layer.

25. The image coding device according to claim 12, wherein the operations further include:
when the 2N×N splitting manner is used for the image block, determining three identifiers corresponding to three candidate transform block sizes 2M×0.5M, M×M and 0.5M×2M as 0, 1 and 2, respectively;
when the N×2N splitting manner is used for the image block, determining three identifiers corresponding to three candidate transform block sizes 0.5M×2M, 2M×0.5M and M×M as 0, 1 and 2, respectively; or
when the N×N splitting manner is used for the image block, determining three identifiers corresponding to three candidate transform block sizes M×M, 2M×0.5M and 0.5M×2M as 0, 1 and 2, respectively.

26. The image coding device according to claim 12, wherein the operations further include:
when the 2N×N splitting manner is used for the image block, determining three identifiers corresponding to three candidate transform block sizes 2TL×0.5TL, TL×TL and 0.5TL×2TL as 0, 1 and 2, respectively;
when the N×2N splitting manner is used for the image block, determining three identifiers corresponding to three candidate transform block sizes 0.5TL×2TL, 2TL×0.5TL and TL×TL as 0, 1 and 2, respectively; or
when the N×N splitting manner is used for the image block determining three identifiers corresponding to three candidate transform block sizes TL×TL, 2TL×0.5TL and 0.5TL×2TL as 0, 1 and 2, respectively.

27. The image decoding device according to claim 13, wherein the operations further include:
when the splitting manner of the image block is a splitting manner 2N×N, obtaining three candidate transform block sizes M×M, 2M×0.5M, and 0.5M×2M;
when the splitting manner of the image block is a splitting manner N×2N, obtaining three candidate transform block sizes M×M, 2M×0.5M, and 0.5M×2M; or
when the splitting manner of the image block is a splitting manner N×N, obtaining three candidate transform block sizes M×M, 2M×0.5M, and 0.5M×2M,
wherein 2M×2M represents a size of the image block.

28. The image decoding device according to claim 13, wherein the operations further include:
when the splitting manner of the image block is a splitting manner 2N×N, obtaining three candidate transform block sizes TL×TL, 2TL×0.5TL, and 0.5TL×2TL;
when the splitting manner of the image block is a splitting manner N×2N, obtaining three candidate transform block sizes TL×TL, 2TL×0.5TL, and 0.5TL×2TL; or
when the splitting manner of the image block is a splitting manner N×N, obtaining three candidate transform block sizes TL×TL, 2TL×0.5TL, and 0.5TL×2TL,
wherein TL represents a basic size parameter TL corresponding to a transform block in each layer.

29. The image decoding device according to claim 14, wherein the operations further include:
when the 2N×N splitting manner is used for the image block, determining three identifiers corresponding to three candidate transform block sizes 2M×0.5M, M×M and 0.5M×2M as 0, 1 and 2, respectively;
when the N×2N splitting manner is used for the image block, determining three identifiers corresponding to three candidate transform block sizes 0.5M×2M, 2M×0.5M and M×M as 0, 1 and 2, respectively; or
when the N×N splitting manner is used for the image block, determining three identifiers corresponding to three candidate transform block sizes M×M, 2M×0.5M and 0.5M×2M as 0, 1 and 2, respectively.

30. The image decoding device according to claim 14, wherein the operations further include:
when the 2N×N splitting manner is used for the image block, determining three identifiers corresponding to three candidate transform block sizes 2TL×0.5TL, TL×TL and 0.5TL×2TL as 0, 1 and 2, respectively;

when the N×2N splitting manner is used for the image block, determining three identifiers corresponding to three candidate transform block sizes 0.5TL×2TL, 2TL×0.5TL and TL×TL as 0, 1 and 2, respectively; or when the N×N splitting manner is used for the image block determining three identifiers corresponding to three candidate transform block sizes TL×TL, 2TL×0.5TL and 0.5TL×2TL as 0, 1 and 2, respectively.

* * * * *